US009370709B1

(12) United States Patent
Hedge, Jr. et al.

(10) Patent No.: US 9,370,709 B1
(45) Date of Patent: Jun. 21, 2016

(54) BLACKJACK/PROPOSITIONS AND JACKPOTS

(71) Applicants: J. Richard Hedge, Jr., Chandler, AZ (US); Aviva R. Hedge, Chandler, AZ (US)

(72) Inventors: J. Richard Hedge, Jr., Chandler, AZ (US); Aviva R. Hedge, Chandler, AZ (US)

( * ) Notice: Subject to any disclaimer, the term of this patent is extended or adjusted under 35 U.S.C. 154(b) by 76 days.

(21) Appl. No.: 13/987,892

(22) Filed: Sep. 13, 2013

Related U.S. Application Data

(63) Continuation-in-part of application No. 12/930,473, filed on Jan. 7, 2011, now Pat. No. 8,747,203.

(51) Int. Cl.
*A63F 13/00* (2014.01)
*A63F 1/00* (2006.01)
*G07F 17/32* (2006.01)

(52) U.S. Cl.
CPC .............. *A63F 1/00* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 7,144,011 | B2 * | 12/2006 | Asher et al. | 273/292 |
| 8,465,021 | B2 * | 6/2013 | Asher et al. | 273/292 |
| 8,474,819 | B2 * | 7/2013 | Asher et al. | 273/274 |
| 2005/0059451 | A1 * | 3/2005 | Shackleford | 463/13 |
| 2007/0085274 | A1 * | 4/2007 | Asher et al. | 273/292 |

OTHER PUBLICATIONS

Practical Casino Math: by Robert C. Hannum & A.N. Cabot Institute for the Study of Gambling & Commercial Gaming-Reno, NV 89557, Copyright (c) 2005 Trace Publications, Second Edition.
Optimal Play: by Stewart Ethier & William R. Eadington Institute for the Study of Gambling & Commercial Gaming-Reno, NV 89557, Copyright (c) 2007 University of Nevada-Reno 89557.
Casino Verite Blackjack: by Norm Wattenberg Q-Fit Books New York, NY 10150, Copyright (c) 2005 Q-Fit Publications, Fifth Edition.
Casino-Ology: The Art of Managing Casino Games. By Bill Zender Huntington Press Las Vegas, NV 89103, Copyright (c) 2008 Huntington Press, First Edition.
Practical Casino Math: By Robert C. Hannum & A.N. Cabot Institute for the Study of Gambling & Commercial Gaming-Reno NV89557 Copyright (c) 2005 Trace Publications, Second Edition.
Optimal Play: By Stewart Ethier & William R. Eadington Institute for the Study of Gambling & Commercial Gaming-Reno NV89557 Copyright (c) 2007 University of Nevada-Reno 89557.
Blackjack Attack; Playing the Pros way. By Don Schlesinger RGE Publishing Ltd. Las Vegas Nevada 89084 3rd Edition (c) 2005.
Two: GLI Math Reports, Dated: Jan. 12, 2012 & Sep. 18, 2013.

* cited by examiner

*Primary Examiner* — Sunit Pandya

(57) ABSTRACT

The Applicants are proliferating a progressively modified process for playing blackjack. The use and display of standard or modified decks of cards, including the use of Joker cards is applied. This process engages an electronic gaming apparatus or "live action" table games, as accommodated for. Players initiate play via standardized Blackjack rules for "Primary & Secondary 'Base' play action(s)." As such, all customarily engaged wagers of variable risks are in play against the Dealer's hand. However, Players can now move into an Alternative Bypassing Strategy, and Secondary Decision-Propositions' process, where Proposition wagers are won or lost before the Dealer reveals their "Hole" card! Secondary Decision-Propositions' events, can be regularly rebooked as an alternate strategy for reaching a winning 20 or 21 outcome for the Player's hand.

11 Claims, 14 Drawing Sheets

COUNSEL I

*HOW TO PLAY:*

Players book their initial "Primary" contract wagers and optional "Ante" wager Side-Bets.

Players are dealt Two (2) cards one at a time, up or down.

Dealers are dealt One (1) card up, and One (1) card, their "Hole" card, is dealt down.

Players may draw card(s) until their best possible hand is made to "Stand Pat" or "Busts."

*BLACKJACK'S PRIMARY & SECONDARY "BASE" PLAY ACTION RULES:*

ALL PLAY ACTIONS ARE PLAYED AND "WON" IN THE TRADITIONAL MANNER.

Players always "Win" on Blackjack!

Players can Double Down on: Any Two (2) cards.

*Fig. 9a*

Players can Split any initial pair of cards: Three times for a total of Four Hands.

Players can Double Down on any Split cards: One (1) card to Ten's & Ace's.

Players can "Surrender" for "Half" their contract wager. Any remaining Side-Bets fall to the House.

All hand count tallies *over* Twenty-One (21) are "Busted," and lose.

All hand count tallies "Standing Pat" *short* of the Dealer's hand count are "Sacked," and lose too.

*THE ALTERNATIVE BYPASS; SECONDARY DECISION~PROP-BOX PLAYS:*

ACTIONS BEGIN & END FOR THE PLAYER; "BEFORE" THE DEALER REVEALS THEIR "HOLE" CARD.

Players can make any Alternative Bypassing Strategy play into the Prop-Box for a winning 20 or 21 outcome.

Players can Split-hands one-card to play against the Dealer; while Playing the other card within the Prop-Box.

Players can Triple Down on any: Two-Card Ten (10) or Eleven (11) Counts, even after Splitting in Prop-Box.

Players can Triple Down on any: Pair of Aces, even after Splitting in the Prop-Box. One (1) card to each Ace.

Players can Triple Down on any: Optional Ace-Ten / Parlay Blackjack™ replay. One (1) card to each new hand.

Players can Triple Down on any: Reciprocal Ten-Ten / Parlay 20™ replay. One (1) card to each new hand.

Players can Triple Down on any: CDM or JCDM event(s). Players can play for CDM's optional Jackpots too.

Both events require "Entry Antes" to play; ONLY a hand of: 21 can Twin-Win, both events.

*SIDE-BETS:*

All first Two (2) card, "Ante-up" types of side-bet wagers are displayed tableside with their Bonus Payoffs.

All first Three (3) card, "Ante-up" types of side-bet wagers are displayed tableside with their Bonus Payoffs.

*A DEALER'S HAND IS IN PLAY ACTION*

*PRIMARY "BASE" PLAY ACTION:*

WINNING HANDS, TIE HANDS & STANDING "PAT" AGAINST THE DEALER'S HAND.

*PLAYER'S "STANDING PAT" AGAINST THE DEALER'S HAND:*

IF: A Player "Stands Pat" with a hand of: TWENTY OR LESS.

THEN: The Player must "Beat" the Dealer's hand tally to Win.

SO: If, the Player "Beats" the Dealer's hand tally without "Busting" they "Win." If not, they "lose."

*(CONTINUED IN FIG. 9b)*

*PLAYER'S "WINNING" HAND TALLY'S:*

IF: A Player "Stands Pat" with a hand of: "BLACKJACK."

THEN: The Player always "Wins," even against a Dealer's BLACKJACK.

SO: The Players are paid: EVEN MONEY on their "Contract Wager."

*PLAYER'S "TIE" HAND TALLY'S:*

IF: A Player's hand tally finishes with the same total as the Dealer's hand tally, this is a "TIE."

THEN: The Player's hand is a "Push / Tie."

SO: The Player doesn't win or lose.

*Fig. 9b*

*PLAYER'S "LOSING" HAND TALLY'S*

IF: A Player's hand tally stands short of the Dealer's hand tally outcome.

THEN: The Player(s) are "Sacked," and LOSE.

SO: The Player(s) lose: 100% of their *total* contract wager. Player(s) are "Busted," and LOSE over 21.

*SECONDARY "BASE" PLAY ACTION:*
DOUBLING DOWN & DOUBLING ON SPLIT CARDS AGAINST THE DEALER'S HAND.

*PLAYER'S "WINNING" HAND TALLY'S:*

IF: A Player "Doubles Down," and their hand tally "Beats" the Dealer's hand tally.

THEN: The Player(s) "Win."

SO: The Player(s) are paid: EVEN MONEY, on the full wager.

*PLAYER'S "TIE" HAND TALLY'S:*

IF: A Player's hand tally finishes with the same total as the Dealer's hand tally, this is a "TIE."

THEN: The Player's hand is a "Push / Tie."

SO: The Players doesn't win or lose.

*PLAYER'S "LOSING" HAND TALLY'S:*

IF: A Player "Doubles Down" and their hand tally stands short of the Dealer's hand tally outcome.

THEN: The Player(s) are "Sacked," and LOSE.

SO: The Player(s) lose: 100% of their *total* contract wager. Player(s) are "Busted," and LOSE over 21.

*NO DEALER'S HAND IS IN PLAY*

*SECONDARY DECISIONS PROPOSITION~POWER PARLAY™ PLAY ACTION:*
PARLAY BLACKJACK & PARLAY 20 HANDS; 10 AND 11 COUNT HAND(S), SPLIT PAIRS, TENS & ACES.

*OPITONAL DIFFERENTIAL "SHORT-WIN" NUMBER IN PLAY ACTION IS: 19*

*OPITONAL DIFFERENTIAL "PUSH" NUMBER IN PLAY ACTION IS: 19*

*OPTIONAL DIFFERENTIAL "MERCY" NUMBER(S) IN PLAY ACTION ARE: 17 & 18*

*(CONTINUED IN FIG. 9c)*

*PLAYER'S "POWER PARLAY BLACKJACK™" HANDS:*

IF: A Player draws a Blackjack upon first Two (2) cards, they Win out right, and are paid off...

THEN: Player(s) have the "option" to rebook, Split & increase new wagers, on both new Ace & Ten card hands drawing One (1) card each for immediate replay within the Prop-Box.

SO: Player(s) are allowed up to a Triple Down for each hand's play action.

*PLAYER'S "POWER PARLAY 20™" HANDS:*

IF: A Player draws a two-card Twenty/20 upon their initial hole-count hand.

THEN: Player(s) have option to take a "Winning Even Money" payment, and rebook new "reciprocal" wagers, upon both new Ten count hands, drawing One (1) card for each, within the Prop-Box.

SO: Player(s) are allowed up to a Triple Down for each hand's play action.

*PLAYER'S "WINNING" HAND TALLY'S:*

IF: A Player draws to an outcome hand of: a repeat TWENTY and/or a repeat BLACKJACK.

THEN: The Player(s) are automatic "Winners again."

SO: The Player(s) are paid: EVEN MONEY, on 20, and at least: EVEN MONEY on the BLACKJACK.

*PLAYER'S OPTIONAL "SHORT-WIN" NUMBER HAND TALLY:*

IF: A Player draws to an outcome hand of: NINETEEN.

THEN: The Player(s) hand is a "Short-win."

SO: The Player(s) are paid: LESS than 100% of their full combined contracted wager.

*PLAYER'S OPTIONAL "PUSH" NUMBER HAND TALLY:*

IF: A Player draws to an outcome hand of: NINETEEN.

THEN: The Player(s) hand is a "Push-play."

SO: The Player(s) don't win or lose.

*Fig. 9c*

*PLAYER'S OPTIONAL "MERCY" NUMBER(S) AND "LOSING" HAND TALLY'S:*

IF: A Player draws to an outcome hand of: SEVENTEEN, EIGHTEEN OR, NINETEEN.

THEN: The Player(s) keeps "HALF" of their Entire Wager at play.

SO: When a Player(s) hand tally "stands short" of the first: short-Win, Push and/or Mercy Number(s) being used, such hand(s) are "Sacked," and lose. Player(s) are also "Busted" over 21.

*NO DEALER'S HAND IS IN PLAY*

*SECONDARY DECISION "CARD DRAWING MARCH" INTO PROP-BOX:*

ALL HOLE-COUNT OFFSET HANDS OR MATCHED PAIRS; SOME RESTRICTIONS MAY APPLY.

CARD DRAWING MARCHES ENGAGE A DIFFERENTIAL NUMBER THREAD MIX FROM: 12 to 21.

CDM'S PLAY WITH OPTIONAL JACKPOTS; EVENTS MAY REQUIRE DOUBLE "ENTRY ANTES."

A CARD DRAWING MARCH TO: TWENTY-ONE / 21, IS THE ONLY BIG WINNING NUMBER TO HIT...

*DIFFERENTIAL "PUSH-PLAY" NUMBER(S) FOR PLAY IS: 20*

*DIFFERENTIAL "SHORT-WIN" NUMBER(S) FOR PLAY IS: 19*

*DIFFERENTIAL "MERCY-SHOT" NUMBER(S) FOR PLAY ARE: 13, 17 & 18*

*(CONTINUED IN FIG. 9d)*

*SECONDARY DECISION "JOKER CARD DRAWING MARCH" IN PROP-BOX:*
ALL HOLE-COUNT OFFSET HANDS OR MATCHED PAIRS; SOME RESTRICTIONS MAY APPLY.

JOKER CARD DRAWING MARCHES ENGAGE A DIFFERENTIAL JOKER CARD REDEMPTION PROCESS.

CARD DRAWING MARCHES ENGAGE A DIFFERENTIAL NUMBER THREAD MIX FROM: 12 to 21.

JCDM'S PLAY WITH OPTIONAL JACKPOTS; EVENTS MAY REQUIRE DOUBLE "ENTRY ANTES."

A CARD DRAWING MARCH TO: TWENTY-ONE / 21, IS THE ONLY BIG WINNING NUMBER TO HIT...

*DIFFERENTIAL "AUTO-WIN" JOKER CARD(S) ARE REDEEMED; THEN REPEATED*

*DIFFERENTIAL "PUSH-PLAY" NUMBER(S) FOR PLAY IS: 20*

*DIFFERENTIAL "SHORT-WIN" NUMBER(S) FOR PLAY IS: 19*

*DIFFERENTIAL "MERCY-SHOT" NUMBER(S) FOR PLAY ARE: 13, 17 & 18*

*PLAYER'S "CDM" HAND ACTIONS:*

IF: A Player draws to a new HOLE-COUNT HAND that is EVERYTHING other than BLACKJACK.

THEN: The Player(s) are qualified to engages a CARD DRAWING MARCH.

SO: The Player(s) may up to Triple Down upon their original contract wager starting the hand. Players then draw cards until a decision to stop. A Player's consequence is born by the number they stop on.

*PLAYER'S "JCDM" HAND ACTIONS:*

IF: A Player draws to a new HOLE-COUNT HAND that is EVERYTHING other than BLACKJACK.

THEN: The Player(s), as they possess Joker card(s), are qualified to engage a CARD DRAWING MARCH.

SO: The Player(s) may up to Triple Down upon their original contract wager starting the hand. Players then draw cards until a decision to stop. A Player's consequence is born by the number they stop on.

THEREFORE: As Player(s) acquire Joker cards via their general card play, JCDM redemptions will occur as players look for repeat Joker's-to-show. Winning "Joker-to-show" outcomes are NOT Jackpot winners, unless they draw a 21 finish!

*PLAYER'S OPTIONAL "PUSH-PLAY" NUMBER(S):*

IF: A Player draws to an outcome hand of: TWENTY.

THEN: The Player(s) hand is a "Push-play."

SO: The Player(s) do not win or lose.

*Fig. 9d*

*PLAYER'S OPTIONAL "SHORT-WIN" NUMBER(S):*

IF: A Player draws to an outcome hand of: NINETEEN.

THEN: The Player(s) hand is a "Short-win."

SO: The Player(s) are paid: LESS than 100% of their full combined contracted wager.

*PLAYER'S OPTIONAL "MERCY-SHOT" NUMBER(S) AND "LOSING HAND" TALLY'S :*

IF: A Player draws to new outcome(s) of: THIRTEEN, SEVENTEEN or EIGHTEEN.

THEN: The Player(s) hand is a "Mercy-Shot." The Players keeps a "Portion" of their Entire Wager at play.

SO: When a Player(s) hand tally "stands short" of the first: short-Win, Push, and/or Mercy Number(s) being used for the 12 to 21 differential thread mix, such hands are "Sacked" and lose. Player(s) "Bust" over 21.

BLACKJACK/PROPOSITIONS AND JACKPOTS

CROSS-REFERENCE TO RELATED APPLICATIONS

This application is a Continuation-in-part of Ser. No. 12/930,473 filed; 7 Jan. 2011, now U.S. Pat. No. 8,747,203.

That is a Continuation-in-part of Ser. No. 12/798,864 filed; 13 Apr. 2010, now U.S. Pat. No. 8,308,540.

TRADEMARK NOTIFICATIONS

This application contains several Trademarks for which the Applicants maintain their exclusive rights, to usage thereof.

FIELD OF INVENTION

This invention relates to games of chance as historically identified with wagering in casinos.

The Applicants' methods and modifications are inclusive to both a variety of live action table gaming formats as well as electronic display applications for play of all types. Their inventive process utilizes both; Standard decks of Fifty-two (52) cards or any of several differing types of acceptably configured decks, such as; over Fifty-two cards (Jokers included) as well as under Fifty-two cards (a.k.a., Carnival or Spanish decks, etc.) with or without Joker cards being added and/or the electronic simulation of all the like, to be specific. By definition, these are "modified decks."

As such, the Applicants' process in allowing Housemasters (i.e. casino management) the ability to apply such a variety of decks is for the direct purpose of; expanding, contracting, and/or otherwise manipulating the core operating margin variances from the usage of such decks, as applied into the Applicants' proprietary Alternative Bypass Strategy action for play, along with the dynamism of its Secondary Decisions model of wagering schemes, being executed for play, through the alternative Propositions process, benefitting their methodology's broader productive utility.

Presently, the Applicants know of no previously established methodologies regarding either "live action" table game embodiments of Blackjack including those banked by a House (casino) or electronic "virtual reality" display methods of Blackjack/21 either with or without Dealers, which are presently under Patent enforcement or otherwise that might be construed as teaching on or reading upon their concepts and process of play.

DESCRIPTION OF PRIOR ART

Blackjack is a premier table game in American casinos as well as casinos across the world. No doubt there is good reason for this. America and the world love card games and they know this game, Blackjack! Actually, it's a love/hate relationship; just ask anyone who plays the game. People love to play Blackjack especially when the cards give and of course take. However, before the further disclosure of the Applicants' Alternative Bypassing Strategy methodologies, a brief discussion regarding Blackjack's traditional play along with some terminology and historical factors are useful in teaching the Applicants' inventive process as described and illustrated herein.

Simply put, the objective in traditional Blackjack is to beat the Dealer's hand. This is accomplished by having a totality of cards that tally higher than the Dealer's cards without going over Twenty-one (21). The card values in Blackjack are as follows: cards Two (2) through Ten (10) are tallied at face value while "face cards" are valued at Ten (10) and Aces are valued at Eleven (11) or One (1). Henceforth, the term "Ten card" will define both Ten (10) cards and/or Jack, Queen & King cards (a.k.a., Court cards). Similarly, a "Blackjack" hand is always made up of the first two-cards dealt; meaning a Ten card and an Ace. The Blackjack hand is also referred to as a "Natural" or when made with Three (3) or more cards, a "21" and is just as generally unbeatable. Although, the dirty fact of the game is that a Dealer's dealt Blackjack hand will most often drive a simultaneously dealt Player's Blackjack hand into an even money decision or, at the very least, a "Push Stand-off" for the Player's hand, meaning the Player's hand doesn't win or lose.

Likewise, a Dealer hand Twenty-one (21) made with Three (3) or more cards always Push all other Player hand Twenty-one's (21's) made with Three (3) or more cards as well. As a practical matter, a Player can win with any total under Twenty-one (21) so long as the Dealer either "Busts" first, or the Player's hand-count(s) finish higher.

Busting in Blackjack is any final tally higher than Twenty-one (21) for either the Player's or the Dealer's hand. But unlike the Dealer, Players will experience the "Double Bust." The Double Bust occurs when Players Bust-out first, followed by the Dealer Busting.

It is this constant reality of the Double Bust, which Players are intractably facing in Blackjack that gives the casino its greatest most frequently exercised "House Percentage Advantage" (a.k.a., Vigorish or "Vig.") over the Players. It is said that the Dealer will Bust 28% of the time however, only the Players can experience the Double Bust, because the Player must act first!

All things considered, Double Busting provides the House with a constant 5.7% advantage over the Players when Double Busting occurs. Therefore, any way you play it within the confines of all traditional Dealer hand methods and rules for playing Blackjack, there remains a powerful House advantage being exacted against all Players within the traditional rules of Blackjack, which must be constantly evaded. This House advantage is the Double Bust effect.

Additional aspects of traditional Blackjack play include the terminology of "Hard," "Stiff," "Soft" and "Pat" hands. A Hard hand is one that either does not have an Ace: 9-7/16 or if it does, it tallies as a One (1): 9-6-A/16. Typically, the Hard-hand totals of Twelve (12) to Sixteen (16) are also called Stiff hands because such hands can easily Bust when drawing the very next card.

A Soft hand is one that has an Ace being tallied as Eleven (11) amongst the first Two (2) cards being dealt: A-6/17, A-7/18, A-8/19 or A-9/20. Regardless whether the Player's hand stands made upon a Hard or Soft 17, 18, 19 or 20, such hands are thought of as Pat hands.

The last two general strategies of traditional Blackjack play include card "Splitting" and/or "Doubling Down," both practices of which Players are well advised to partake of, though tableside restrictions will vary from House to House. Most often when Players engage the practice of card Splitting & Doubling down, the decision is simply weighed against the Dealer's "up-card". Should the Dealer's up-card be a Bust card; 2, 3, 4, 5 or 6 this often inclines the Player to Split their paired cards, such as; 2's, 3's, 4's, -6's, 7's, 8's, 9's or Aces when they otherwise may not.

This scenario facilitates a great Splitting opportunity or better yet, as paired Aces reveal, a fantastic multiple Double Down action against a Dealer's weak up-card, although Players may draw out as many cards as necessary in a normal card Splitting situation until they either Stand Pat or Bust! Similarly, when Splitting Aces many casinos allow only One (1) card for each Split Ace.

In further regard to Doubling Down, again it's a good idea to Double Down whenever the opportunity arises, although Doubling Down is sometimes restricted to a Player's first Two (2) cards tallying Ten (10) or Eleven (11) only. Moreover, several restrictive rules pertaining to Splitting & Doubling Down, are put into place by Housemasters (casino management) as a means to maintain "a desired core operating margin position" for their Blackjack games, therein benefiting their casinos. Therefore, these rules will vary based on subserviently subjective factors. Additional subservient factors are found within the "Insurance & Surrender" rules as historically applied.

Traditionally, Insurance is offered when the Dealer's upcard is an Ace. For the unwashed, Insurance is generally thought of as a "bad bet," but does protect the Player's wager in the event the Dealer has Blackjack with a Ten (10) hole card. As for the traditional practice of the Surrender rule option (either early or late Surrender and where it is still found), this rule enables the Players to withdraw from the hand for half the original contract wager. This action is taken by Player(s) when it's felt the Dealer's hand is so strong (often repeating up-card Tens & Aces) that keeping half the original contract wager is clearly better than losing all of it.

In America today and throughout the world, Insurance is readily found as part of the Blackjack gaming scene where Surrender rules are not so readily found outside of Asia and Europe. The reasons are simple, Insurance is generally thought of as a bad wager for Players to engage in while Surrendering against continually "strong" Dealer hand upcards, in a few cases, is a good idea.

Of course, the Surrender action as historically deployed assumes the Player is not motivated to just simply get up and leave . . . .

The above background rendering of traditional Blackjack rule play pretty much covers all the essential bases of Blackjack play, however certainly not all the "Basics" of Blackjack play.

As such, the Applicants are referring to the qualities of play employed through the application of competent "Basic Strategy" play and the much more elusive "Advanced Strategy" (a.k.a., Advantage Play, Advantage Player or AP) play. Additionally, within the bounds of traditional Blackjack's Basic Strategy, as written about in so many books on topic, there lies a most critical body of knowledge for which the Player must acquire an a fortiori logic to win.

This competency of logic is regarding the speculative business of card counting as well as a cultivated knowledge of why & when to execute play action Ante wager Side-bets that can also prove constructive in the acquisition of more winning sessions rather than losing sessions at Blackjack. Notwithstanding, other advantage techniques like: hole-carding, shuffle-tracking & various camo-play actions, of which for the sake of brevity, the Applicants will pass over such details . . . .

As for the public's interest in card counting as an applicable skill, it's of no real surprise, given the number of fairly well rounded Basic Strategy players there are at large today. Moreover, this encroaching advance against the rather thin House advantage of the traditional Blackjack game via the art of card counting, as spurred on through strong Basic Strategy knowledge, has become so pervasive in recent years that now every on-looking Basic Strategy Player and Basic Strategy want-to-be-Player around, especially the mediocre ones, think becoming an "Advantage Player" or AP (which is what an effective card counter is), is the next even axiomatic step of natural progression. Wrong, ft's not! And, it's not about just reading a few more books either . . . .

Truly effective AP play, is very rare and represents a fundamentally unique set of highly massaged skills. Such skills demand the pre-requisite ability to accurately count down a deck of cards in less than 30 seconds, for at least 45 minutes at a time, and that's just for starters. A simultaneous presence of mind capable of properly advancing a preplanned bet spread, as their "True count conversion" opportunities demand is also required. And then, there's the application of the correct "Key Strategy Assumptions" of which there are 18 structured decision choices to be applied. And, all this represents a mufti-layered calculus of reflexive on demand decisions to be assessed in addition to simultaneously perfect execution of Basic Strategy play.

Oh, and all this is assessed and applied on average in less than 20 seconds between turns at play by this very rare Advanced Strategy card counting Master-mind at play . . . No problem, right?

Then there is this little issue of finding Single, even Double Deck games that do not engage a 6 to 5 payoff on Blackjacks. These games you must steer well clear of, and what a coincidence, it just so happens that a huge number of "single deck" games now pay this paltry 6 to 5 payoff while offering no other wagering recourses (incentives) to execute upon during play action.

So suffice-it-to-say, "card counters" generally speaking pose no particular threat!

In Las Vegas and around the country, many casinos offer, under the guise of Single Deck action, a number of 6 to 5 games on their casino's floors (i.e., Natural Blackjack payoffs being paid at: 6 to 5 over the traditional Blackjack pay off of: 3 to 2). A single act by Housemasters (that alone) makes beating the House in Blackjack even by Ken Uston, were he still alive, all but impossible. This "cynical" Blackjack payoff trend adds another 1.40% to the core margin of the House's Vig-advantage where Players actually play and tolerate this.

Worse yet, this surreptitiously defensive trend is still spreading and, as advertised, has proven extremely disadvantageous to both the "stout" Blackjack Players and the more profligate too-smart-by-half type weekend Players alike who prefer Single or Double Deck play action!

Similarly, it's been observed that for the stout Blackjack Player the main purpose for acquiring the skill and confidence that card counting promises is to know when to "hit" to improve a Stiff hand or better yet, to "pitch" the Dealer Bust cards.

Although for the largely reckless card counter, what card counting is probably best suited for is, avoiding the dreaded Double Bust effect as well as evaluating both Insurance plays and certain Side-bets, and an occasional Surrender play, wherever allowed and whenever it's wise.

The fact is these skills alone will save "profligate" weekend Players a bundle against a casino full of scorching hot Dealers! Consequently, for the fifty, or possibly a hundred, truly Advantage Players running around the world today, high stakes private games are the surest alternative for acquiring uncontested play which is often negotiated with casinos. As such, these "Freeze-out" games (a.k.a., Freeze games) are where the truly Advantage Players are typically revealed.

In this situation, the House is assuming such a Player is a card counting professional and enters such a Freeze game scenario with their eyes wide open . . . . Moreover, from the Player's standpoint, this scenario assumes the Advantage Player's mental acuity will remain sharp enough for a long enough session of time to get through the prearranged dollar figure draw across the table (usually 6, 7 or even 8 figure sums of money).

In the end, the edge that quality card counting provides, is that minds-eye intuitive impetus to "make the play," and for this aforementioned very rare breed of gambler that strong pulling back counter intuitive perspective that can effectively act with 20/20 hindsight! However, significant danger lies within the collateral effects of card counting. Such advantages being sought are summarily undone when either Basic or AP mishaps occur . . . .

Specifically, in the capacity of lost count(s), whereby impacting the efficiency and effectiveness of the count's purpose up to 0.75% in the marginal advantage being sought, depending upon their frequency of occurrence and remaining deck configuration, and whereby the Player's entire count effort will likely be made in vain.

As for the House's Vig-advantage in the game, most Blackjack games not allowing Surrender enjoy a scant 0.60% edge on average; although, 0.60% is proven historically rich enough for the House to make a profit in most operating circumstances.

However, these common, even standardized rule expectations upon the game are confining to the operating margin reality (House percentage edge) and leaves little in the margins from which to innovate with, which is another admission as to just how remarkable this application's "Grandparent" disclosure is, particularly in view of what it accomplishes; meaning there is a proprietary component of the parental disclosures for which the Applicants have again statistically discovered can also be "effectively grafted and expanded, into the margin mathematics of Dealer Hand Blackjack" through this new model's Alternative Bypass Strategy play along with the advantage menu of their Secondary Decisions' wagering options, as further being deployed through the game's Propositions Box of processes, and as all being further advanced and illustrated within their newest disclosures being discussed herein.

Therefore, in pursuit of such ends, what we are left to start with, from one historical extreme, is an extraordinarily thin margin variance, which already means; the Applicants' orchestrations to create and implement constructive alternative rule play modifications, along with all their practical and pertinent benefits should not further "thin down the game's margins." Likewise, at the same time, the Applicants' rule changes must not "bloat-up" the game's margins either, to where Players simply cannot win . . . Players and Housemasters alike, will generally resist a Vig-advantage >3% for a Blackjack game without good reason, and juicy lures for such actions being taken.

SUMMARY OF THE INVENTION

As will become quite clear, the Applicants are proffering a "new play action model" for Blackjack. Now, included within the ongoing classic Blackjack play action, the Applicants are further advancing the disclosure of their optimal "Alternative Bypass Strategy" action for play. This process already allows for tremendous new player dynamics via; their one-of-a-kind means for laying-off the more than 38% of Stiff-hands coming to players over their long-run of play, while allowing for uncommon "Triple Down play" and true-to-form POWER PARLAY™ events, carrying about the same degree of calculated risk as historical Double Down plays do. Plus, there are even more new options!

The Applicants are also now revealing a new cast of "Ante operable wagers" for which Players can engage upon which mimics traditional "Split-hand" play although, a matched hole-count pair of cards (i.e 2, 2), is not a prerequisite, as any initial hole-count hand may play. As such, what is now being revealed herein are CARD DRAWING MARCHES™, including the provision of an exemplary methodology model, and means to "player-fund" deployment of an associated Jackpot.

Indeed, the Applicants now establish the "full monty" of recourses for progressively volatile play action, through their menu of wagering options; including those actions having that extra, even extravagant degrees of high stakes excitement! Although, originally rising out of the disclosure from the Parent file of record, this new and now full course menu of wagers in toto, with there simple play action applications, reinvigorates "Dealer Hand Blackjack" in major ways, with even more unforeseen advantages being projected into the traditional game.

By application, the CDM events being discussed herein may interact via a required Ante-up, working as a means to bolster the mathematics at work, notwithstanding an optional Jackpot that does require an Ante. The Applicants are also revealing their expanded "differential thread mix agency" for either CDM model, for play action too. So then, "Mercy Numbers" (i.e. MNs) as now disclosed, will allow for the "taking of a portion" of the Player's wager(s) within the larger spectrum of the Twelve (12) to Twenty (20), thread mix. Similarly, as applied, "Push Numbers" (i.e. PNs) and/or "short-Win Numbers" (i.e. sWNs) ranging from 12 up to 20, are also a part of this new disclosure wherein acting as component agents for application into the Propositions' process; meaning upon a Player's short-Win, "less than a 100% payoff is made" while a "Push is a Tie," and all "undesignated numbers from 12 up to 20," playing through any applied play of the thread mix are standing losers. Of course, "Twenty-One" is always at least a 100% of contract winner!

Therefore, these optional plug-in/plug-out component agents however applied, function as coalescing agents for ameliorating exposure to the intensified play action within the "Prop-Box". As such, these Winning, short-Winning, Push, Mercy & undesignated numbers along the thread, can be applied individually or as operational set(s) of numbers, in there applications from 12 to 21, for direct play action support of the numerous wagers being applied in play through this thread. Whereas, all initial contract wagers begin within the Primary Base play action, while all Secondary play actions are defined as any amount being added to any "initially contracted" amount(s).

Likewise, this further includes any action being booked for play through either a "Secondary Base" play action or from the "proprietary menu of Secondary Decision events," being played-out in concert with any or all components of the Prop-Box's menu of random agents, like thoughs of the MNs, PNs, sWNs, and Winning Numbers (i.e. WNs) from 12 up to 21, being applied in play.

Moreover, with or without an Ante wager requirement being applied either prior-to play, or a commission percentage rake or fee being applied to Winning wagers post-up to the hand's completion in play, or whether optional short-Win, Push-play-tie and/or Mercy Number(s) are coalescing component agents working as a means for ameliorating a Player's exposure to risk in play, the general Propositions process for wagering remains uniquely advantageous for the Housemasters and Players of the Applicants' modified play action process moving forward.

How? Players simply elect to move into this Propositions-Box as they are presented with good opportunities to do so, and then continue to draw through a flow of cards from either real or simulated deck(s) or shoe(s) of cards for their required outcomes to "win," assuming of course, Players are not Busted or Sacked, shown some Mercy by losing only a portion of their wager(s), experiencing a Push-play hand, or even catching a short-Win play along the way.

However, unlike the traditional game of Blackjack, the Applicants' creation and enlistment of the Propositions-Box establishes a powerfully constructive and spontaneously accessible parallel play option dynamic. First, routinely used as an Alternative Bypass Strategy for "Stiff hole-count" hands, where this action alone is a great advance for the game of Blackjack and yet, the greatest contribution of the Applicants' methodology is certainly its facilitating means for projecting this "panoply menu of Secondary Decisions, into the publics eye." Clearly, the introduction of the Propositions' process, is the end-game, that designates the fork in the road of play so to speak, that routing selection process; that choice, Players have option to make while executing their play.

In reference, the Applicants' methods "build upon," these important new elemental tactics for play action; bypassing when expedient, the existing menu of "prevailing risk" already being projected out from the traditional portion of the game's adversarial process. For example, a smart "bypass" consideration is particularly when Players find themselves "Stiff-handed" against the Dealer's repeating Nine, Ten or Ace up. Furthermore, the Primary & Secondary Base play actions whereby Players draw card(s) to "beat" the Dealer's final hand count vs. an array of Secondary Decision events being played-out through the player's final standing hand count(s), as applied in comparison to applicable pay table(s) of consequence via the Prop-Box, is what actualizes this aforementioned "fork in the road" for Players.

For another example, as the Player contemplates the booking of an alternate Secondary Decisions wager, the Player may also enjoy a simultaneous option to initiate a Secondary Double Down play against a Dealer's perceived weak up-card too, initiating first as a Primary Base play action, then transitioning to a Secondary Base play action, just as would be customary within the Primary & Secondary Base play of any traditional game's adversarial process against the Dealer's hand in play.

Conversely, the Alternative Bypass Strategy move and Secondary Decisions' process bears uniquely defensive characteristics too, in that any Player after evaluating the Dealer's up-card, and then their own hole-cards for a quick analysis of general advantage, might first, as a means to abate the drawing of another losing Stiff-hand, consider a bypass play to avoid further contact with the Dealer's hand for the round. By doing so, the Player forgoes play against the Dealer's hand opting instead, to rebook a more suitable Bypassing Strategy play, into the menu of Prop-Box options.

Indeed, the harsh reality of Blackjack is, that the player is going to acquire a great many hole-count Stiff-hands, they are an evitable consequence of play. Stiff-hands will eventually level-out to 38.5% of all hands played in the long run. However, a Player could receive 70+% Stiff-hands for their short visit, and will lose 49.2% of all Stiff hands, regardless. Now Players, finally have a most effective means for laying-off these terrible often disastrously repeating Stiff-hands anytime the player wishes, through the Applicants' unique Prop-Box, as used defensively via the Alternative Bypass Strategy in play. Then again, Players having better hole-count hands will often bypass traditional play, even Double Down play method(s), to opt-into such a Propositions: 20 & 21™ play action especially since 20 & 21 are both winning outcomes in most instances for the Player. Players may also be lured in with short-Win or Push Number(s), and/or a mix of Mercy Number(s), from: 12 to 20, like the use of Seventeen (17), Eighteen (18) or Nineteen (19), as a common example.

The magic of this Secondary Decisions menu of wagers, as advanced via the Propositions' process, as initially disclosed within the Applicants' Grandparent disclosure, was not mathematically visible until the know how of having No Dealer Hand at play was resolved. As too, is the case herein, the entrance of the more formally complete Secondary Decisions menu of wagering options, as affiliated with the Alternative Bypass Strategy, allowing for the bypassing play action away from the Dealer's hand, as now being "grafted" into the traditional game of Blackjack by the Applicants, has proven to be a rather fortuitous collection of consequential events here as well.

Why? First of all, unlike the Grandparent case to this application, no other method or entity that the Applicants know of, has to date, ever made Blackjack functionally competitive in play WITHOUT a Dealer's hand operating within it's play.

Moreover, without that discovery coming first, the concept of the Propositions: 20 & 21 class of wagers, both with and without the optional short-Win, Push, Mercy and/or undesignated losing number selections, ranging from Twelve (12) up to Twenty (20), as well as other tricks would never have had cause to be revealed to them for this model's methods & processes either.

Secondly, to the Applicants' knowledge, no other source has ever suggested the importation of such a Propositions' class of wagers, as is being introduced through the Alternative Bypass Strategy process within this method, much less illustrate the means by which this class of wagers would function and flourish within the historically thin margin mathematics of the traditional play action environment. Additionally affecting the players of the Applicants' methodology is the wholly optional impact of the now to be disclosed, composite of differing deck types, and/or shoe configurations, being offered and applied during the game's play. Originally, in the Parent case, these optional deck configurations were simply identified as "modified decks".

Insofar, as a Standard Fifty-two (52) card deck is used, an operative "House-Advantage" edge or HA, of: "X" percentage value in the margin exists, while the card configuration of say a Carnival deck configuration having Fifty (50) cards in play would represent a: "Y" HA, or Vig-margin value. Further still, a Spanish configured deck with Forty-eight (48) cards in play offers even yet, a more generous Vig-margin affect of "Z" percentage value in margin, as all presently given example.

In play action support of the Applicants' methods, such deck configurations provide wide measures of core margin for the House's use along with a panoply of wagers being orcastrated; via the Applicants' "finely tunable differential thread mix agency" with its powerful Vig-advantage result, being exacted from each "X, Y or Z" solution, of applicable "deck" options being used in play.

In further review, the Carnival and/or Spanish deck types being applied to the Applicants' play action methods defines Carnival decks as having either their "Red or Black" Ten (10) Pip-cards removed, with the two Joker cards being put in as replacements, whereby enlisting a wide degree of valuation (i.e. deployment & redemption applications) an purpose (i.e. application to the game and/or special marketing tools for the sponsoring casino) for such Joker cards, being applied.

Similarly, Housemasters might simply elect to remove the red or black Ten (10) Pip-cards alone, without Joker replacements. Likewise, the "Spanish-type" decks by definition have all Ten (10) Pip-cards removed from play action, with the use of Joker cards being strictly a new option.

Furthermore, such specialized deck configurations comport very well into the Applicants' broader process for play action; via their methodology's creation of this simultaneously accessible "parallel play action dynamic" of additional options which are being broadly designated, as the "Secondary Decisions menu of 'volatile' wagers," as all previously discussed in detail.

Remembering, the Secondary Decisions' menu of wagers represents this fork in the road; these new choices the Players have the option to take. Therefore, these very methodologies including their various deck configurations present Players with an "intensive menu of variable risk" for all Secondary play action activity across the Applicants' game, as the entirety of all the functioning dynamics making up the coordinating pay tables within the Prop-Box are applied.

As such, the implementation of the menu of Secondary Decision choices playing-out within the Prop-Box expands upon the POWER PARLAY BLACKJACK™ event as previously taught, and further continues to expand the menu of wagering events to include the POWER PARLAY 20™ event, and CARD DRAWING MARCHES™ or CDM's, along with a self-financing progressive Jackpot, all of which systemically projects the reality of this "fork in the road" for wagering considerations.

Also, in example, programmed electronic apparatuses including wireless processing devices (including simi-digital table game formats), make for fast play action where "Split-hand" cards are played upon a strategy wherein One (1) of each of the Split-hand's cards is wagered upon a differing pay table of elevated risk. One hand against the dealer, and one hand plays the Prop-Box!

Similarly, as has been taught, there exists many possible play action embodiments for culminating the Applicants' gaming modifications that are applicable, especially as applied into programmable electronic devices, yet only one discussion of these embodiments in counsel form, is cited below, for development of such applications serving as the necessary disclosure hereto.

OBJECTIVES AND ADVANTAGES

Traditional Blackjack is the most quintessential table game encompassing the psyche of the world's casino going experience. This is true even if you don't play the game. Almost nowhere, save for Macau, will you go into a casino and not find Blackjack front and center to the table gaming action! Accordingly, several objectives and advantages are clearly achieved by way of the Applicants' applied methodology model, wherein having this Alternative Bypass Strategy and menu of higher stakes Proposition action(s) coalescing onto the center stage of Blackjack's classic play is made moving forward.

Therefore, with the booking of a contract wager, all Players are dealt Two (2) cards up or down while the Dealer receives one card up, and one card down. Then starting with the person sitting at first base on the table, each Player seeing the value of their present Two (2) card tally, along with the Dealer's up-card, have fast decisions to make.

Do they "Surrender," "Draw" card(s), "Stand Pat," "Double Down" and/or "Split" their cards, including Splitting their cards for Double Down play action(s) against the Dealer's possible final standing hand count? All of these options begin as Primary Base actions then frequently advance, into Secondary Base play action(s), as being repeatedly developed & discussed herein.

Or, if perceived achievable, do Players assume the different calculated risks of the Alternative Bypass Strategy as wisely applied to Stiff-hands, or its Secondary Decisions model, be it for executing a "general advantage" by avoiding strong Dealer up-cards, or for executing POWER PARLAY™ action (s) and CDM's for their stand alone "No Dealer Hand involved" outcome actions?

In actual play action, such Secondary Decision wager(s) move into the Prop-Box, or are marked as such, and are readily identifiable upon any game table layout offering this class of wagers whereby exposing such wager(s) and completed hand count tallies to this significantly swifter play action process! This too, is the procedure even when CDM's require an "Ante-up" for play action. In most circumstances, the Applicants' menu of Secondary Decision play options function like this: The Player evaluates his hand's options for overall play. Once the Player concludes that a Prop-Box action is the play to make, the movement of the Player's contract wager(s) actually occurs. So, the Dealer in order of turn, then recognizes the Player's desire to bypass traditional play and re-routes and rebooks the Player's hand into the Propositions-Box for pursuit of this Player's action to completion, prior to the Dealer revealing their "Hole" card to ANY players, playing in the hand.

Typically, Players will be initiating either a Stiff-hand menuver bypassing the Dealer's hand, or moving hole-count, Ten (10) or Eleven (11) hands to the Prop-Box for a Triple down action. However, the Player may be playing Split Aces in the Prop-Box or taking-up the Power Parlay™ of a hole-count Twenty (20), or a winning Blackjack hand for a shot at the Prop-Box's play action, where the Player can leverage what appears to be good timing for such an action.

Although, regarding a hole-count Blackjack, these Ace-Ten hands do start as automatic wins wherefore the Secondary Decision being offered here, is now a "bonus option replay." As Such, a rebooking, rewagering replay of the Player's Blackjack hand via the individual replaying of their Ten (10) & Eleven (11) count card(s) then occurs. Most importantly, these hands are susceptible to being "Tripled upon" prior to drawing their typically One (1) new card allowed per hand in play.

Additionally, regarding the new two-card POWER PARLAY 20™ hand, these hands can play straight-up against the Dealer's hand in play as traditionally done, or they can Parlay into Two (2) new "reciprocating Ten (10) count hands." As Parlay actions, they first begin, with a payoff of the initial two-card Twenty (20) hand having already been drawn, whereby the player must then Split & re-play the two Ten (10) count cards individually. The players of such events can also Double or Triple Down upon their original contract wager here as well. Moreover, should a player elect to play straight-up against the Dealer's hand, this is still a time honored option for playing a hole-count Twenty (20) hand. However, a most enticing new decision for the Player is the ongoing attraction to the thrilling experience of winning one of these POWER PARLAY™ hands, as weighed against the similar 8 to 5 degree of probability risk exposure that is endured to win a standard Double Down play, and still, without the need to beat the Dealer's hand to boot! Without a doubt, it becomes an obvious risk to take! Especially, since the two new bonus PARLAY BLACKJACK'S™ pay: 3 to 2 . . . .

Of course, this "simple 8 to 5 rule of thumb," is largely non-applicable to the Advantage Player who likely has a firm minded notion as to what his probability risk truly is . . . . However, as aformentioned, there are still definite instances where a player would be compelled to move "any unrestricted card(s)" to play the Prop-Box (especially some Stiff-hands), drawing cards for an exact 20 and/or 21, count to win. One of yet another circumstance, is when a player draws less than Seventeen (17) with the Dealer's up-card showing an "Ace" (without a Blackjack). The compelling strength of the Dealer's "soft-hand" is why the Propositions play option is the one to take. Moreover, should the player enjoy exposure to the coalescing short-Win, Push-play and/or Mercy-shot number agents too, this move to the Propositions-Box is all the more beneficial.

This process is repeated for each Player expecting to play and complete this class of wager before the Dealer reveals their "Hole" card, whereby the customary process for play action still remaining for those Players not engaged in their own Alternative Bypass Strategy play or Secondary Decisions play for the round, are brought to a resolution through the "revealing" of the Dealer's "Hole" card followed by the traditional process and manner for completing the round. Again, as is the case with the customary procedure for Doubling Down, Player's are faced with a significant consequence when booking into this tacitly "8 to 5" probability assumption/equation followed up by the often at least "2 to 1" probability against drawing the typically sought after Ten-card(s) needed for winning this wager when drawing upon all types of Ten & Eleven count hands.

Why? First, if we are to accept the notion that essentially no one who is contemplating a traditional Double Down action is drawing for less than an outcome of Twenty (20) and preferably an outcome of Twenty-One (21), which is a "rather universal truth" about taking such an action, then we can begin to see the equation take shape. Afterall, who's hoping to draw to a 19 or less ?

And second, as the Player sits with a one, two or perhaps, even more than a two-card Ten (10) or Eleven (11) count hand, looking to achieve an outcome of Twenty (20) or Twenty-One (21) with their very next card, there lies Five (5) ways to acquire either outcome drawing from a Ten (10) count tally, that being a 10, J, Q, K & Ace. And, similarly, from the Eleven (11) count tally, a 9,10, J, Q & K does the job. Furthermore, when Splitting paired Ten-cards & Aces, "Ten-cards" are what's being sought! All the while, fighting Eight (8) ways of missing such outcomes, which are all other cards.

Voila! The fundamental "8 to 5" relationship to the cards, appears.

Most importantly, what is lingering, is the reality that the Player must still beat the Dealer's hand . . . . Moreover, within the bounds of the Applicants' methods, Players are automatic winners on both outcomes of 20 & 21 . . . Yet, with NO help from, or liability to, a Dealer's hand in play. Likewise, as alluded to from above, AP's combining both card and shoe tracking techniques may be "technically capable of exploiting for a limited time," the hand-to-hand probabilities affecting successful timing for many particular decisions such Players make, especially when poor game protections exist . . . .

Now, that a fundamental understanding of the modus vivendi for this menu of Secondary Decision wager(s) is established, a review of the modus operandi illustrating the way these wager will actually function via the Propositions-Box during the play action of the game is useful.

As a matter of procedure, this Propositions: 20 & 21™ to win class of wager. BEGINS & ENDS FOR THE PLAYER BEFORE THE DEALER REVEALS THEIR "HOLE" CARD. Likewise, as previously referred to, this action is for a "Do or Die 20 and/or 21 to win" standing outcome regardless of whether any number(s) from 12 to 20, like those typically of 17, 18 or 19 are being applied as active short-Wins, Push-play Numbers and/or whether Seventeen (17), Eighteen (18) and Nineteen (19) or for that matter, any numbers between Twelve (12) and Twenty (20), are being applied and playing-out as just plain losers, or instead are being applied as an active means to deploy Mercy-shot number(s) during such play actions, as just another example.

Therefore, as has or will be shown, several of the Applicants many possible Secondary Decision solutions being typically made operable from the game's core mathematical function are of a progressively intriguing persuasion of elevated risk, as is especially demonstrated, regarding the new menu options and recourses for play action being further constructed in detail below. Clearly, each of the Applicants new Player resource wagers, like that of the tag-along designed "Ante-up Joker's Jackpot" which as wagered upon, is booked simultaneously along with the Player's booking of at least one CARD DRAWING MARCH™, CDM or JCDM, and are just three means by which Player's will engage exciting new possibilities for the Blackjack franchise at large.

Also, there are the fantastic "POWER PARLAY™ re-play hands," being made available in this mix of Player options, all of which are directly compatible with the Applicants earliest formulations & disclosures. Again, in actual play action, any Secondary Decisions wagers as moved up into a Prop-Box wagering area, or markered as such, are readily identifiable upon any game table layout, whether used for increasing an initial wager(s) or booking a new wager, while exposing said wager's completed hand to a significantly swifter risk & reward event from what they would otherwise experience within the Base play action of the game alone! Remembering, all monitary increases made to a contract wager during the play action of the game are by definition Secondary Decision plays, whether the hand is played against the Dealer's hand or within the Proposition-Box.

In a nutshell, the idea and application of the Alternative Bypass Strategy play, and/or menu of Secondary Decisions for "Player recourses" is to accommodate the Applicants unique discovery for allowing Players to PLAY LONGER by laying-off Stiff-hands into the Proposition-Box's flexibly assigned consequences and/or to reach for the casino's "Chandeliers" as it were, when engaging their differing Ten (10) & Eleven (11) count hands for multi-down plays, Parlaying Blackjack & hole-count 20 hands, or executing the new Two (2) card, and/or Split-hand single-card CDM actions, along with it's additional "progressive Joker's Jackpot" opportunities, as aforementioned.

Subsequently, for either the Applicants' Alternative Bypass Strategy play, or menu of Secondary Decision wagers, Players can now routinely resolve to reconsider and re-engage the status of their "initial Base contract" wager(s) as a move to the Propositions-Box commences; meaning after booking their first contract wager and viewing their first Two (2) hole-count cards.

Therefore, should a Player desire to increase their wager(s) this new protocol now allows for such an action before drawing additional cards, and as such, defines a "key purpose" relating to any wager being moved into the Propositions-Box, starting from the player's initial hole-count hand(s). Additional to this process, is a compelling, specialized means for action being made available through the distribution & redemption of Joker cards via Standard, Carnival or Spanish types of modified decks or shoes being used, and will prove a useful "enabling factor" even aside from possible entry "Ante-ups" being applied for access when allowing for Joker CDM's through the Prop-Box. However, CDM's can occur at will, again aside from entry "Antes being paid to the House," and without Joker-cards, by players who bear the added risk . . . Pay tables dictate payoffs!

Remembering, the Secondary Decisions regime is ALL ABOUT the "Secondary Base play action vs. the Proposition Box's regiment of Secondary play actions." Players, can and will, utilize both paths for Secondary Decisions when engaging all of their differing Ten (10) & Eleven (11) count hands, Splitting and Multiplying Down on paired Aces or even the Ace-Ten Blackjack and Ten-Ten/POWER PARLAY 20™ hands, as they contemplate play against the Dealer's up-card with its possible outcome or they decide to make their play action within the bounds of the Prop-Box.

And now, as just sighted, we're adding two types of CARD MARCHES™ and, an "Ante-up Jackpot" to this menu mix of options . . . As this all assumes the Player is willing to withstand the elevated risk of getting Sacked or Busting as the circumstance may play out. The lure for such play, is the numerous starting hands that are already half-way to a strong POWER PARLAY™ event, or are great plays for increasing their original starting wager(s), too vigorously play-out offset hole-count CDM's, starting a new round. However, "House restrictions" particularly upon all Aces, and two-card Eleven hands for CDM actions can be applicable. As such, all Aces involved with any CDM will bare a value of One (1) . . . And, all Two (2) card Eleven (11) count hands may require a Split into Two (2) CDM hands for play actions, in this example. Other restrictions may apply. Therefore, the totality of the Applicants' unique methodology model(s) provide a "whole new outlook" directly supporting most all of the aforementioned features & benefits from their game's core-math mechanics, wherein such actions occur "before the Dealer reveals their 'Hole' card."

By way of such design, Housemasters can modestly increase or decrease the game's critical core operating margins in addition to the margin-costs of applied rules & payoffs in play; starting with the affective choice of deck configuration, and this all before the first card is ever drawn. In addition to all the above citation, below are just a few clarifying examples regarding the use of differing deck configurations, when engaging Joker cards, and all the other details are in "example" form too, and applicable for either programmable electronic, or physical table game solutions.

Typically, the broadest range of allotments for Joker cards will be "up to" Two (2) Joker cards being applied in play, per deck in use, or say within an Eight (8) deck shoe this would allocate "up to" Sixteen (16) Joker cards for use in play, etc. After there first use for JCDM's, Joker-cards, will be tied to hole-count "Joker/Ace" instant bonus outcomes, or as a paired Ante wager Side-bet. The methods for Joker card acquisition can come to the player for other reasons and applications as well; either by way of the player's first Two (2) hole cards at the start of a new hand or from the random draw of cards during the course of playing a hand. In all cases for this scenario, the Joker cards are immediately replaced with the very next card or cards, off the deck or shoe.

Now, such Joker cards for table game play are "held for/by the player" to then be redeemed in a future hand of the player's choosing, during the play of each deck or shoe. And second, the redemption of Joker cards become one more tool and means for inducing player participation into an arena of the game delivering a much richer core-margin advantage for the House. Through such a redemption cycle of said Joker cards, a: Joker's CARD MARCH™ is then ensued through one of the Prop-Box's menu of pay tables being assigned.

The mechanics for such Joker card redemption for this example, in practice, begins by the player establishing a new wager in the Base play action of the game, this is then followed by the player acquiring a new two-card hole-count hand.

Next, if the player decides to act, "they advance (slip) a 'presently held Joker card to be redeemed, face-up' under the existing contract wager" whereby then, likely being moved up into the Prop-Box wagering area for play through either a fixed play action menu or a selected video menu, according to the player's desire and appetite for risk! It is now, the player is allowed to increase the contract wager on the table to at least Double Down event(s).

Therefore, the hole-count cards already being established for the hand, begins the Joker's CDM . . . win, lose or push. However if, another new Joker-card shows upon the draw while engaging such a redemptive action with a cumulative hand count that has yet to Bust, this results in an "instant winning draw" of at least an Even Money payoff, to the Player. This is regardless of the number of cards being drawn, or whether a JCDM starts with one or two cards per hand, if the next card out of the shoe is a new Joker-to-show, the hand is over, the Player wins!

It simply does not matter how many cards are drawn before a repeat Joker shows, as long as the hand does not "Bust over 21," first . . . There will be times when playing little cards, and lo-hands into CDM action will be advantageous, there will also be times, that only "Aces" should play!

However, the more aggressive CDM for example, could easily look something like this . . . Say, a Player draws an initial hole-count hand beginning with a pair-of-threes, or say an ofd set hand of a 6 & 3, and since the Player has decided to make two CDM plays, and this Player has "no Jokers working" for either hand, therefore he begins his CARD MARCH™ from one of the first Split/3's," or Split-Six & Three hand(s), or again from a single combined hand of Six (6) or Nine (9).

Next, the player begins to draw cards . . . And, most importantly, the first opportunity to stop drawing cards comes arbitrarily, on say Sixteen (16), then again on Eighteen (18), where these two outcomes are playing as PN's for this action, thereby leaving "Twenty-One" as the single WN target too draw to; winning say 5 to 1, in payoff . . . All other possible outcomes are undesignated losing numbers being applied within a particular pay table's Twelve (12) through Twenty-one (21) differential thread mix of number agents in play. This is an aggressively exciting play, and if, the Player also Tripled Down on both CDM events before starting out, paid they're possibly required CDM "Entry Antes" upon both hands, along with the Two (2) "Ante-up" wager(s) needed for a "double attempt grab" at the Joker's Jackpot as well, then a very BIG WIN is possibly at hand.

Furthermore, because of the "implied means of a safety-net" of which Mercy Numbers, Push-play Numbers, short-Winning Numbers, and the Joker-card redemption process alike can all be a part, there is plenty of Player modivation for engaging either/or both CDM's. Simply put, players are routinely compelled to go-for-it, and reach for the hugh potential of that march to a "21 & VICTORY!" Again these results stand, regardless of the accumulation of cards being drawn, be that one card or ten cards, as long as the Player stands before Busting-out occurs.

Also, Players can only win either type of CDM in one of three ways, by the drawing of a sWN, a WN, and always at least the hand-count total of 21, or if, a new Joker shows in the draw of a JDCM action! In the end, this Splitable Multi-down action, along with that extra Player's edge of the Joker-to-show process working as an instant win, will lure very significant CDM activity.

Additionally, the choice of either wager, CDM or JCDM play, is CRITICAL regarding the overall ancillary playing conclusions, including any use of MN, PN, sWN agents being applied. Therefore, given the adjustible margins being provided through the game's deck configurations, composite rules for play, and application of any coalescing component agents as applied and illustrated, our exemplary model being sighted just below is comprehensive.

Insofar then, since the House is being generous with the CDM rule/options, our Player, after paying possible entry Ante(s) being required, will elect to pursue two CDM's simultaneously one after the other. One will play-out as a CDM, and the other will play-out as a JCDM.

Now, for the rules of this example:

First, NO two-card Eleven (11) hand counts are allowed to initiate CDM play, such hands must be Split. All Aces are valued at a count of One (1). And second, the ancillary use of MN's, PN's and sWN's, both where and when applied, along with the redemption procedures for "Joker-to-show" play action leaves the only BIG Winning Number left to show as a Twenty-one (21).

For example, when engaging either or both types of CDM from a random hole-count hand, such a hand, including what is "otherwise a resthcted" hand, may play. Therefore, for our examples, lets say said Player draws a soft Fourteen (14) as their hole-count hand. Next, the Player sees the Dealer's up-card is a Ten (10) card again, and wishes to avoid play against said Dealer's hand.

Why? Because the Player keeps losing against the Dealer's 9, 10 & Ace up-starts. So, how does this player finish their hand? Why, its through the Player either "Bypassing into the Prop-Box" with their soft Fourteen (14) hand for the draw of their next card(s) or enters the Prop-Box for play via the newest menu option of the CDM's, drawing from what is now a starting point of an Ace (1) and Three (3) cards; equaling one starting hand of four (4), or from two CDM play actions starting as single hand-counts of a Three (3) hand, and One (1) hand, respectfully. Remember, "Aces" always start at One (1), or are valued as a One (1) for all CDM play actions. Furthermore, regardless whether there is one hand at play or two, application of the Applicants' Twelve (12) through Twenty-one (21) differential thread mix is engaged for CDM activities. Therefore, the Player begins to draw cards, and the first number within the thread mix application a Player can draw to is: a Twelve (12), and it's a loser to stand upon for this House's CDM rules.

The next chance for a decision to stop drawing cards will come along upon Thirteen (13), and it will be applied as the first Mercy-shot Number in play, where the player may stop his march and "keep Half of his cumulative wager at risk."

So if, a player had a $10 dollar wager that was Tripled to a $30 dollar wager, and elects to stands upon a MN, the player then keeps $15 dollars and loses $15 dollar to the House.

However, said player will be sacked losing all, if standing upon any of the next few "undesignated" hand counts of Fourteen (14), Fifteen (15), & Sixteen (16), therefore the Player will likely keep drawing cards.

The hand-counts of Seventeen (17) and Eighteen (18), is where the next Mercy respites lie, here on Seventeen or Eighteen the player can quit and keep Half of their wager again, or press on!

Next, Nineteen (19) plays in the opposite manner as 13, 17 & 18, in that standing on 19 the player short-Wins half, and is paid $15 dollars, upon his $30 dollar wager at risk, in example.

Moreover, should a Player draw to a fast Twenty (20) outcome(s) (Splitting Tens, and then drawing Ten-cards) or drawing to any Twenty (20) outcome for that matter, this player has acquired a Push-play Number play outcome, where the Player pulls down and KEEPS their entire CDM wager to then play their next CDM hand, or await their next round of play.

Now this leaves the possible "Joker-to-show" outcome for the JCDM hand at play. As such, a repeating Joker-to-show win, is a "sudden victory outcome" paying the player 100% of their cumulative wager, a $30 dollar wager pays $30 dollars back, instantly! This is regardless, of the number of cards being drawn throughout the Card March. Likewise, this is the additional advantage "help" the player realizes in a JCDM redemption cycle at play if, the additional Joker shows in the draw before the Player's hand Busts!

Moreover, as an addendum to the CDM play action, the Applicants' methodologies now declare another example of how the ameliorating dynamics of this game's numerous play actions work to so significantly expand upon the House's Vig-advantage, and therefore income; including through their "Joker's Bonus Jackpot" protocol means about to being conveyed.

In furthering our disclosure, and as previously inferred, CDM play action by the Player is a prerequisite for accsess to the Joker's Bonus Jackpot.

The Joker's Bonus Jackpot is another Side-bet that accumulates into an uncapitated Jackpot via "Antes, Rakes & fees" from CDM activities until it's won, then its process replicates again.

All CDM Jackpot plays, require the Player to pay an Ante-up fee, prior to drawing their cards. This Ante-up fee, can be equal to a "small % portion" of either the Player's initial or total contract wager(s) at risk, or can be a "fixed flat fee" (i.e. $1 to $5 per hand), a Player must pay to participate in feeding the ongoing Jackpot opportunities being associated with their CDM efforts.

Also, as the Player books the more aggressive CDM's or the less aggressive JCDM's, all hands ending with a winning score of: Twenty-one (21), then contribute another Rake % Fee, to the Jackpot from such winning CDM's play action, right off the top, as the players is paid off.

In this way, the second infusion means for replenishing the Joker's Bonus Jackpots is made. As such, say up to a 20% Rake, could be extracted from each Player's winning CDM as they occur in live action games, or as they occur via video play action; operating on the casino's LAN or WAN, which represents two differing Jackpot feeds and sources from first the Player's activities, and later benefitting the House, as they draw upon their "Admin % Rake" for all subsequent Jackpot payoffs.

All Ante-up fees are ×2, if the Player is booking "Split" CDM's back-to-back. In applying first Ante-up fees, then Rake fees upon winning CDM hands, two (2) key, yet simple working replenishment methods for continuously rebuilding a Jackpot's post-win cash growth is secured.

To recap, Players can WIN this twin-win event, inclusive to either CDM, along with the Jackpot, if a winning point count of exactly Twenty-one (21) is achieved, and; assuming all required "Ante-up's" were paid prior to the start of the CDM. All "other WN, sWN or Joker-to-show outcomes" will result in a win of some measure, either with or without that win Rake/Percentage Fee being attached yet, only according to their respective pay tables and House directed rules.

However, in these "other" scenarios, the player still "fails to win" the Joker's Bonus Jackpot!

In other uses . . . Should both a Joker and an Ace come together as an initial hole-count hand, this would statistically demand a bonus payoff. This circumstance can be with or without an Ante-up consideration, and completely up to Housemasters. Also, not to be overlooked, should a "Pair of Jokers" show in an initial two-card hole-count hand, wherein such a showing could easily comport into a "first two-card Ante wager," which would pay a very special bonus payoff while leaving said Joker cards from both scenarios to still be redeemed later, before the shoe plays out.

Furthermore as a practical matter, having just outlined the Joker's Bonus Jackpot as the Applicants have done above, it is assumed that the House can at it's whim, deploy any number of "other" useful methods for "funding any and all," types of Jackpots.

This clearly means that Housemasters can utilize completely outside methods, such as third party financing agencies thereby funding numerous types of "life changing anomaly-outcome Jackpots" for the attraction of some.

For Example

Trip Sevens: 7♣ 7♥ 7♦;
Trip Flush Sevens: 7♥ 7♥ 7♥;
Short Draw Straight 21: 6♠ 7♦ 8♣ ;
Short Draw Straight Flush 21: 6♥ 7♥ 8♥;
Long Draw Straight 21: A♥ 2♣ 3♣ 4♦ 5♦ 6♥;
Or, even the really
Long Draw Straight Flush 21: A♠ 2♠ 3♠ 4♠ 5♠ 6♠ .
Which is truly, astronomically rare . . . .

Such anomaly based outcomes, would surely be offered with Joker-to-show implications as well . . . .

Actually, Housemasters can and will, create and apply many differing methods and purposes for Joker card deployment(s) as they see fit, with their many corresponding Rules & Payoffs and/or Antes, Rakes & Fees along with the ancillary consequences upon the respective pay tables in use.

As such, the Applicants' unique methodology models provide a "whole new outlook" that as presently discussed is; utilizing a Standard deck of cards that directly originates, and then projects many of the Applicants' methodology features and benefits from its core mathematical mechanics for play, while still providing for all the necessary elements of a sustainable addition to the classic Blackjack workhorse of which the public will enthusiastically embrace.

Furthermore, it is the principle objective of the present methodology model to provide a wholly new gaming process and dynamic, while requiring only routine mental focus to enjoy a seamlessly familiar playing experience.

It is another principle objective of the present methodology model to provide a wholly new paradigm of thought provoking play that competently coincides with accepted mathematical mechanics and procedures regarding applied probabilities of chance projecting from the applied integrated core resource of first the cards along with their shuffle mix dynamic, their play action distribution, and then their actual assimilating engagement to the players during play action.

It is still another principle objective of the present methodology model to provide for the application of a number of acceptably configured decks of cards or the electronic representation thereof, be they Standardized, Carnival or Spanish decks which can include the usage of Joker cards during their composite revelation to Players, for which application thereof, provides a certain degree of mathematical volatility and value, being built into the basic functions of the game whereby Housemasters can apply many differing types of wagers and methods; including Joker card deployments, redemptions and payoff regimes with their corresponding rules and consequences.

It is yet another principle objective of the present methodology model to provide for the proprietary adaptation of an Alternative Bypassing Strategy action play and menu of Secondary Decision options for play action via the Prop-Box's processes whereby wagers from this Secondary Decision's menu of wagers are booked and ensued to completion through the Prop-Box, before the Dealer reveals their hole-card to such Players, during the course of finalizing their hands.

It is still yet another principle objective of the present methodology model to provide for a proprietary adaptation allowing Players to actually move any initially "unrestricted" card(s) into the Propositions-Box play action process, whereby Players can better shepherd the play of certain weak Stiff-hands to the possibility of better outcomes, via the Alternative Bypassing Strategy play, over that of continually facing down a strong Dealer's up-card.

It is still another principle objective of the present methodology model to provide for the engagement of the Applicants' Alternative Bypassing Strategy that allows players to reconsider, and increase the amount of their initial Base contract wager(s), even after viewing their first two hole-cards, whereby if a player desires to increase their "initial Base contract wager(s)," this model now allows for such an action, before drawing additional cards, therein defining a "key purpose" relating to any class of wager being offered through the Secondary Decisions' options or as simply being moved into the Prop-Box in order to execute a "bypassing play" with suddenly larger stakes . . . .

It is still even another principle objective of the present methodology model to provide for a proprietary adaptation allowing Players to book any "Split-able cards" into Two (2) simultaneously separate play actions wherefore, playing at least One (1) part of this Split-hand's play action against the Dealer's standing hand count while playing out the other part of this Split-hand event's play action within the Proposition-Box's panoply of play options being offered.

It is another principle objective of the present methodology model to provide for the optional use of Mercy Numbers, Push-play Numbers, short-Win Numbers and Winning Numbers acting as coalescing component number agents. These agents are applied either individually or in set applications; comprising any numbers from Twelve (12) up to Twenty-one (21) that can be expanded or retracted numerically in there differential use, whereby benefiting the House's subsequent operational "win percentage values" which also regulates the House's win/lose cycles from such component agents being applied to the Applicants' Alternative Bypass Strategy play and/or more aggressive Secondary Decision's menu options as executed through the Prop-Box.

It is still yet another principle objective of the present methodology model to provide for the optional proprietary adaptation of Mercy Number(s) for taking "only a portion" of the Player's total wager on standing hand counts; being applied from Twelve (12) up to Twenty (20) for concurrent play action of any Alternative Bypassing Strategy play or menu of Secondary Decisions playing via the Propositions-Box, as a means to "ameliorating a degree of risk," whereby inducing a better Player participation for these otherwise Do or Die to win outcome events.

It is yet another principle objective of the present methodology model to provide for the optional proprietary adaptation of a short-Win and/or Push-play Number(s) for paying out less, and allowing for Ties, on standing hand counts; being applied from Twelve (12) up to Twenty (20) for concurrent play action within any menu of Secondary Decisions playing via the Propositions-Box as a means to "ameliorate degrees of risk," whereby further inducing a better Player participation for these otherwise Do or Die to win outcome events.

It is still yet another principle objective of the present methodology model to provide for the additional proprietary adaptations of the Secondary Decision types of Multi-Down play action events; including the Parlaying of Blackjack hands, and the Parlaying of initial hole-count Twenty (20)

hands, offering much higher volitility while still allowing for such players to engage a Parlay, split and/or increase replay process as applied to the "initial Base contract amount" of their wagers.

It is still another principle objective of the present methodology model to provide for the engagement of the Applicants' Secondary Decisions process that allows players to reconsider and increase the "initial Base contract amount" of their wager(s), after viewing their first two hole-cards, and before drawing additional cards for any specialized CARD MARCHES™ (aka., CDM & JCDM) being applied through the Secondary Decision's menu process inclusive too, useful applications of any coalescing agents: MNs, PNs, sWNs, WNs or Joker cards being applied in play.

It is still yet another principle objective of the present methodology model to provide for the additional proprietary adaptation of the Applicants' Secondary Decisions menu of play action options, that allows Players to acquire access to a Bonus Jackpot option, as a consequence of entering play action upon either type of CARD DRAWING MARCH™.

It is still yet another principle objective of the present methodology model to provide for the additional proprietary adaptation of the Applicants' Secondary Decisions menu of options, that allows for Players to pay possible "entry Antes" being required therein, for further making themselves eligible to play for the optional Bonus Jackpot too, once its Ante-up fee(s), are also paid up by the Player(s) prior to commencing play for either type of CARD MARCH™.

It is still yet another principle objective of the present methodology model to provide for the additional proprietary adaptations of the Applicants' Secondary Decisions menu of options, that allows the House to acquire a Rake/percentage Fee from Players, as a means whereby all CDM's or JCDM's actions drawn to winning hand-count of "21" points, directly contribute to the accumulating Bonus Jackpot at the point of payoff.

It is still yet another principle objective of the present methodology model to provide for the access of the Applicants' Secondary Decisions menu of options, that allows for Housemasters to exact as much as a 25% Rake, upon a Jackpot's accumulated total prior to each winning pay-out, as an administrative fee. Individual State Gaming Control Jurisdictions dictate all policy options; regarding what the House can, or can not do, in the matters of Rake percentages . . . .

Another consideration regarding the Applicants' Blackjack methodology model is to make their gaming modifications available for application into an encompassing array of third party computing apparatuses, utilizing programmable electronics, video display devices, and/or third party hand held or otherwise wireless devices, for distribution of their Proprietary methodologies across suitable LAN's and/or WAN's, or the like (not shown).

DESCRIPTION OF DRAWINGS

The foregoing features, advantages and other objectives of the Applicants' methodologies and modifications will become even more clearly understood from the following flow of decision chart embodiments for progressive events as taken in conjunction with the accompanying "description of counsel" (rules and play options) encompassing any Table gaming and/or Programmable Electronic video or wireless gaming display apparatuses being applied for the same.

FIG. 9*a* Illustrates an exemplary counsel embodiment along with its play action(s) & payoffs.

FIG. 9*b* Illustrates a continuing counsel embodiment along with its play action(s) & payoffs.

FIG. 9*c* Illustrates a continuing counsel embodiment along with its play action(s) & payoffs.

FIG. 9*d* Illustrates a continuing counsel embodiment along with its play action(s) & payoffs.

A DETAILED DESCRIPTION OF AN EXEMPLARY EMBODIMENT

Figure 1:
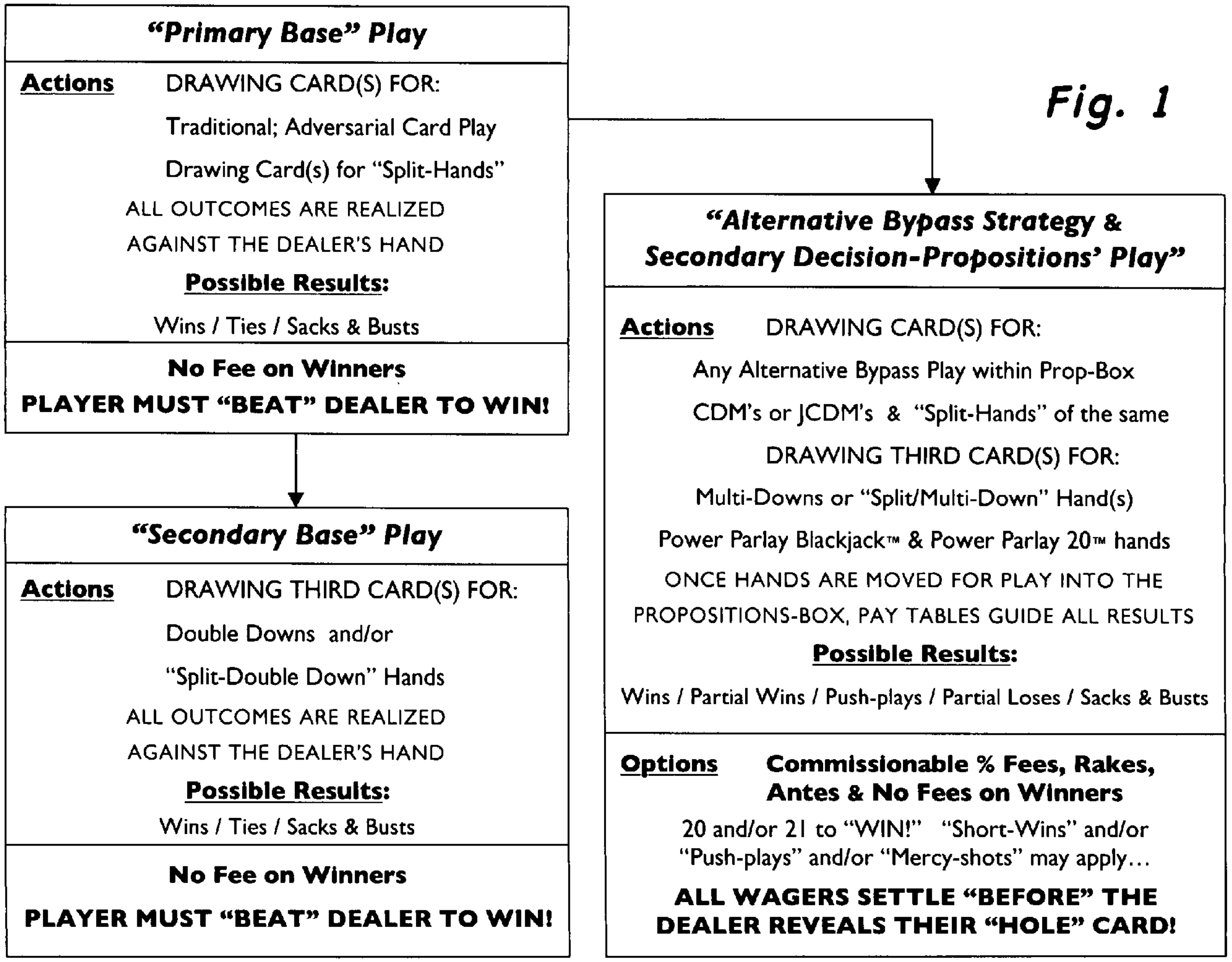
FIG. 1 Illustrates the general selection of Primary and/or Secondary Decision option(s) for the game.

In referring to the drawings as illustrated, it shall be understood that the combined entities of FIGS. 1 through 9*d* inclusively, establish an expanded exemplary embodiment for Blackjack of which the Applicants are further disclosing their systematic means for deploying their "Alternative Bypass Strategy" method; including a fully functioning depiction of a newly expanded menu of "Secondary Decision" options, as played and processed, via their Propositions-Box model.

As such, the unique play action of the Applicants' Alternative Bypass Strategy and Secondary Decisions menu for wagering coalesces its influence through the core mathematical calculus of the traditional game; albeit the method and function of the Applicants' Secondary Decisions' revelations are subject to a less calculating change process than the host of co-active traditional interactions (rules) being simultaneously made available for application within their model's traditional "Base rules" for play. This is because once established, the actions occuring within the Propositions-Box are largely isolated from the mathematical influences of the Dealer's hand, and gemeral play actions, of the traditional game during play.

Therefore, the Base rules as being applied within the "traditional Blackjack aspects" of the Applicants overall play action model are subject to significant changes at the whim and purpose of the sponsoring organization (casino) with little effect upon the various Secondary Decision options as made available through their game's Alternative Bypass Strategy and wagering processes.

This pertains to all traditional variations for Blackjack's play which are all mimicked on the front-end-start of the Applicants' methodology model, prior to the player being enticed with what is a "bypass decision." As every Player thereof, can now experience a means for laying-off the kind of repetitious hole-count hands that has historically plagued Blackjack's operational paradigm.

Likewise, all methods & means for public access to the Applicants' Alternative Bypass Strategy and Secondary Decisions' options, inclusive too optional coalescing short- Win, Push and/or Mercy Number component agents as applied, be it through live action or electronic video, wireless communications, mobile-internet devices and otherwise, represents the many anticipated deployment avenues for adaptation, of the Applicants' uniquely modified model, of their game of Blackjack, when wagering either into, or through, the traditional game's of basic processes for play.

Therefore, upon the booking of a required minimum contract wager and any optional "Ante" wager Side-bets being offered, a new hand begins with the acquisition of both the Player's and the Dealer's first two-cards. Next, the Dealer and each Player then assess their first two-cards to discover if a "Blackjack" has been dealt to them and, if so, does the Player wish to only receive their guaranteed win payment and stop, or do they wish to make a "Parlay-Split & Increase" for what then will become Two (2) new hands, whereby redrawing for each of the now Ace & Ten card hands, as discussed in detail in FIG. 5. Also, as will frequently occur, this process will find Players holding hole-count Twenty (20) hands against a Dealer's Blackjack. However, a Player's "Parlay 20" hand option is not automatic, its still a lose when the Dealer, draws Blackjack against it.

Figure 2:
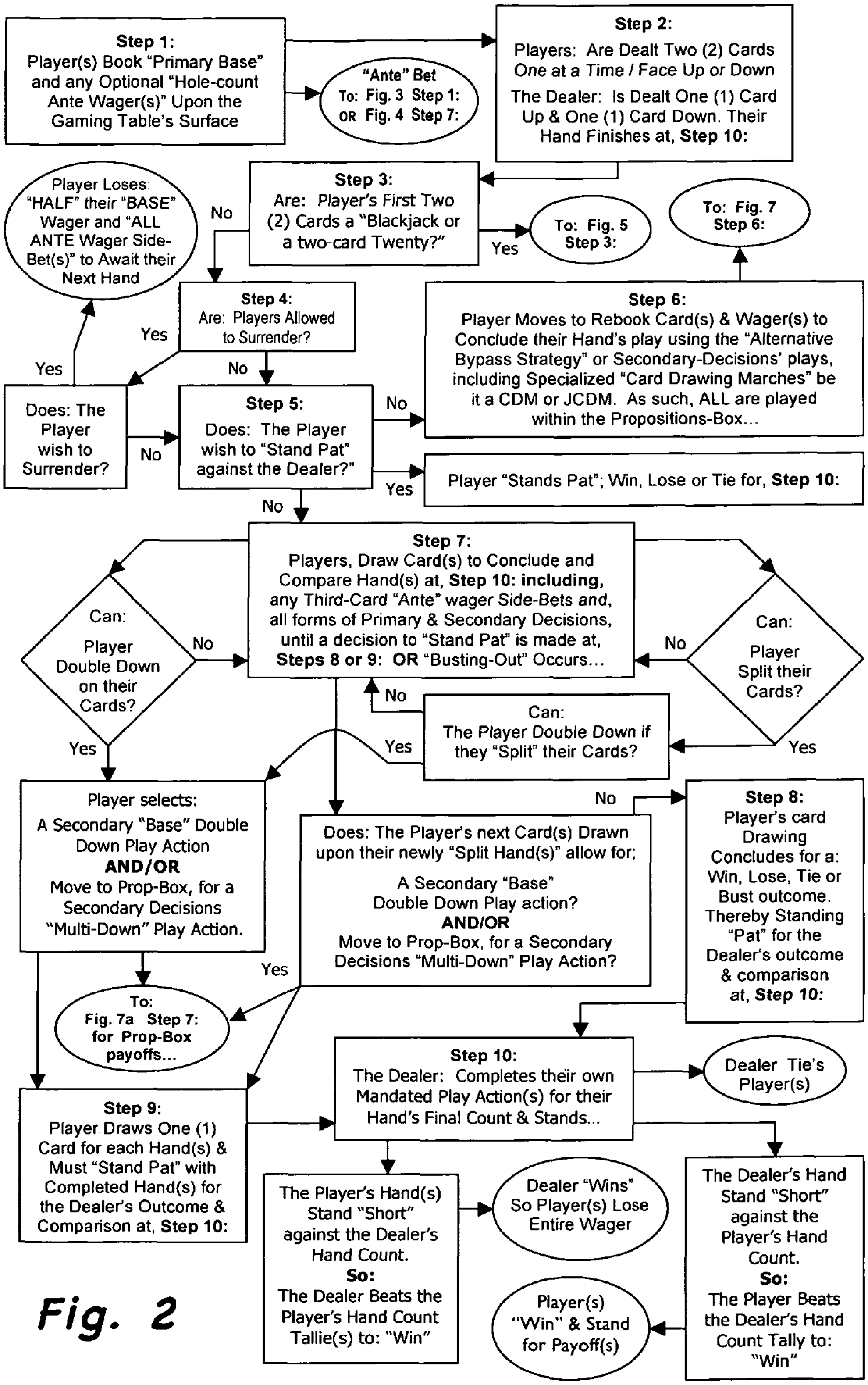
FIG. 2 Illustrates the general flow of progressive event/decisions to complete a round of play.
Figure 3:
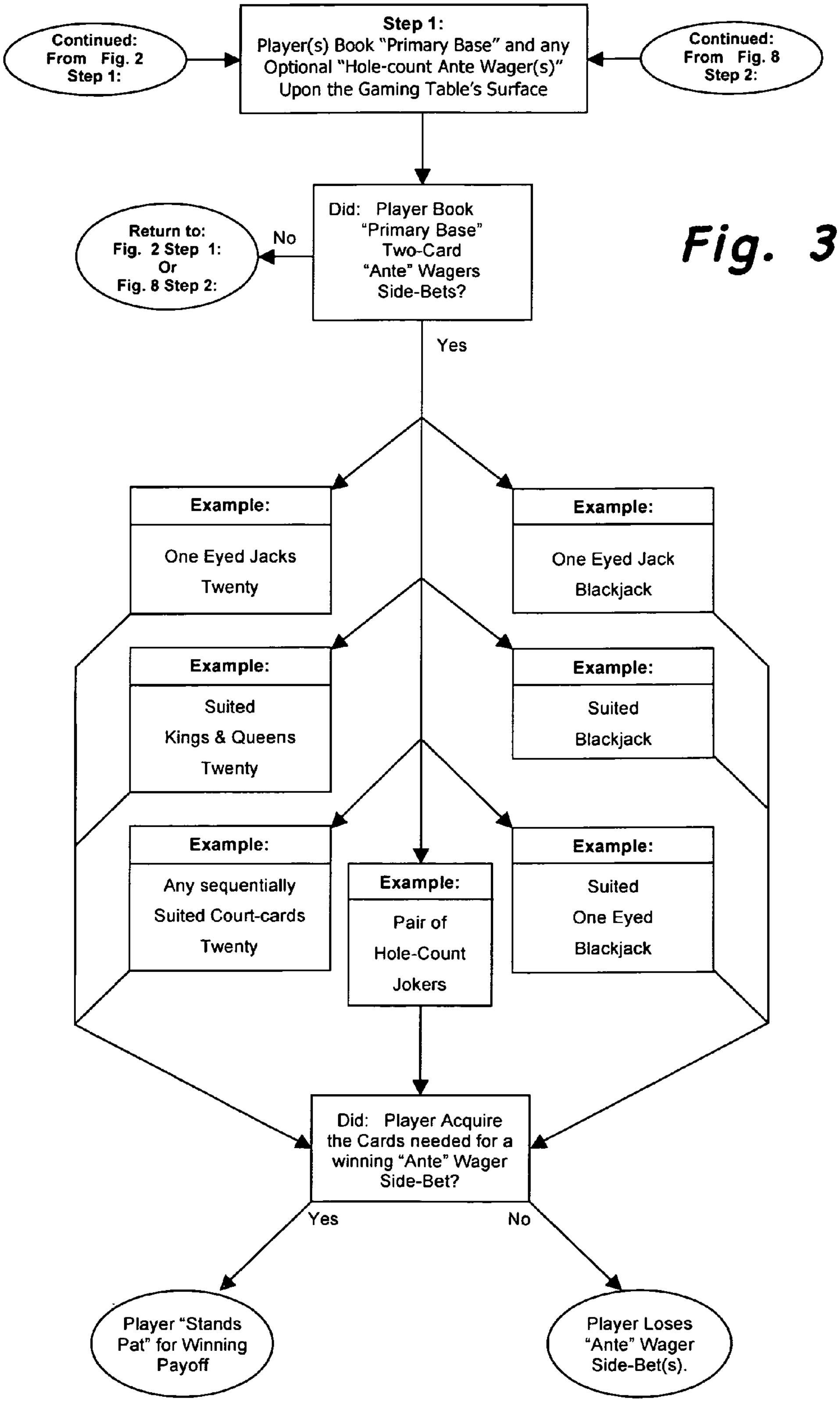
FIG. 3 Illustrates some options for a first, two (2) card ancillary "Ante" type side-bets.

Assuming then, that the Player hands continue for the round, the Dealer then evaluates as they engage each Player if, any ancillary two-card winning hand tallies exist to include those of any two-card winning Ante wager Side-bets having been made, as shown in FIG. 3. If not, then a decision to Surrender may be considered should that option be available to the Player, as illustrated in Step 4, and Step 5, of FIGS. 2 & 8, respectively.

In the absence of an immediate winning or a standing hole-count tally outcome or a desire to Surrender their hand, Players will likely be compelled to draw at least One (1) card as to at least avoid being "Sacked" with a poor hand count should they not be holding a "Pat" hand. Historically, it has always been the Player's prime motivation to draw and acquire a winning hand over that of Dealer's up-card possibilities while drawing as few cards as possible, even bypassing other play options to successfully engage their hand's play without Busting to achieve such ends.

Indeed, the general decision to draw card(s) can come with additional possibilities for Players either by Splitting any pair of equally valued cards, like: 2's, 3's, 4's, -6's, 7's, 8's, 9's & Aces, or Doubling Down on their cards assuming their cards and the Dealer's up-card warrants such an action, or both Splitting and Doubling Down against what should then be a weak Dealer's up-card.

Figure 7:
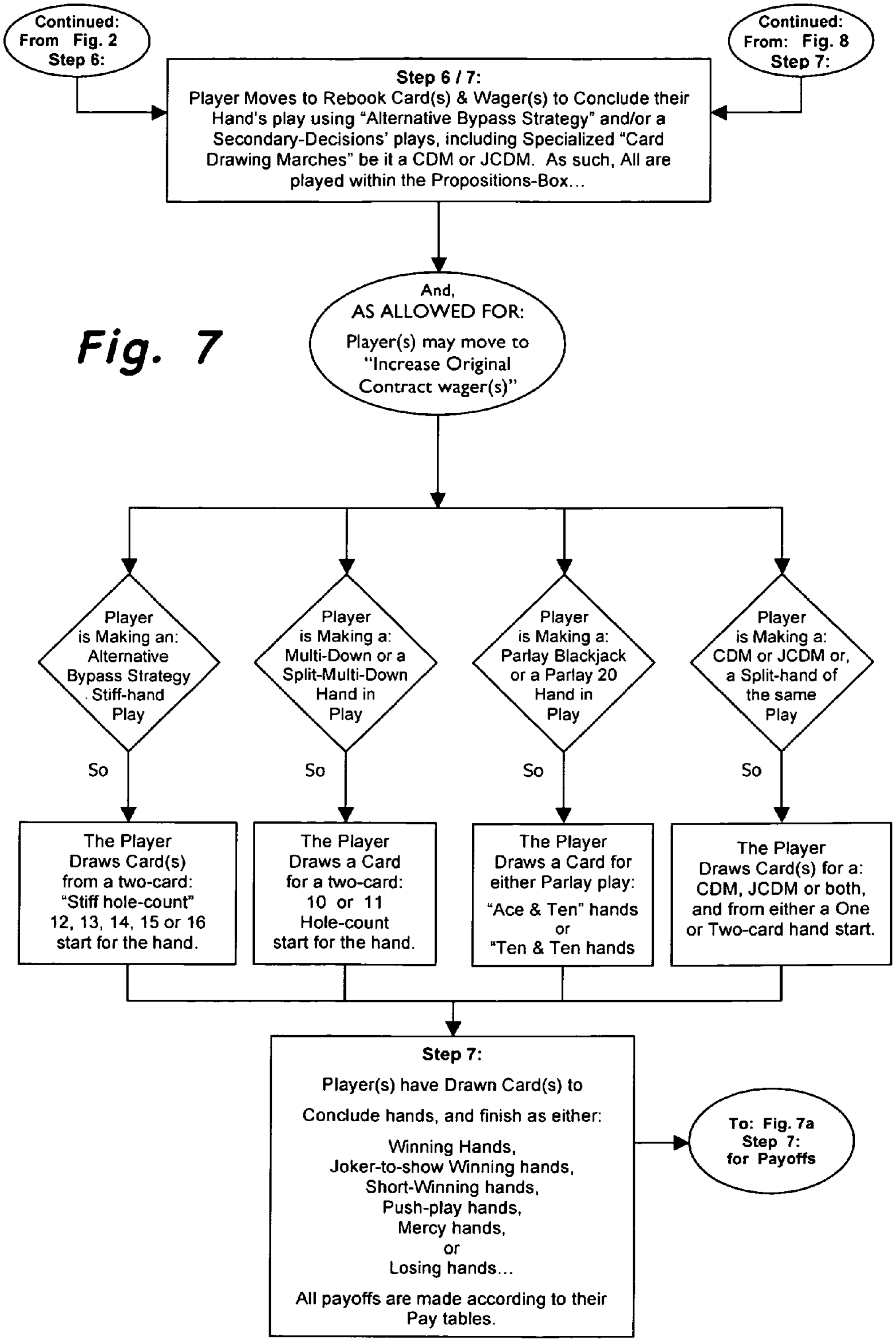
FIG. 7 Illustrates the broad use of the Alternative Bypass Strategy & Secondary Decisions outcomes.
Figure 7A:
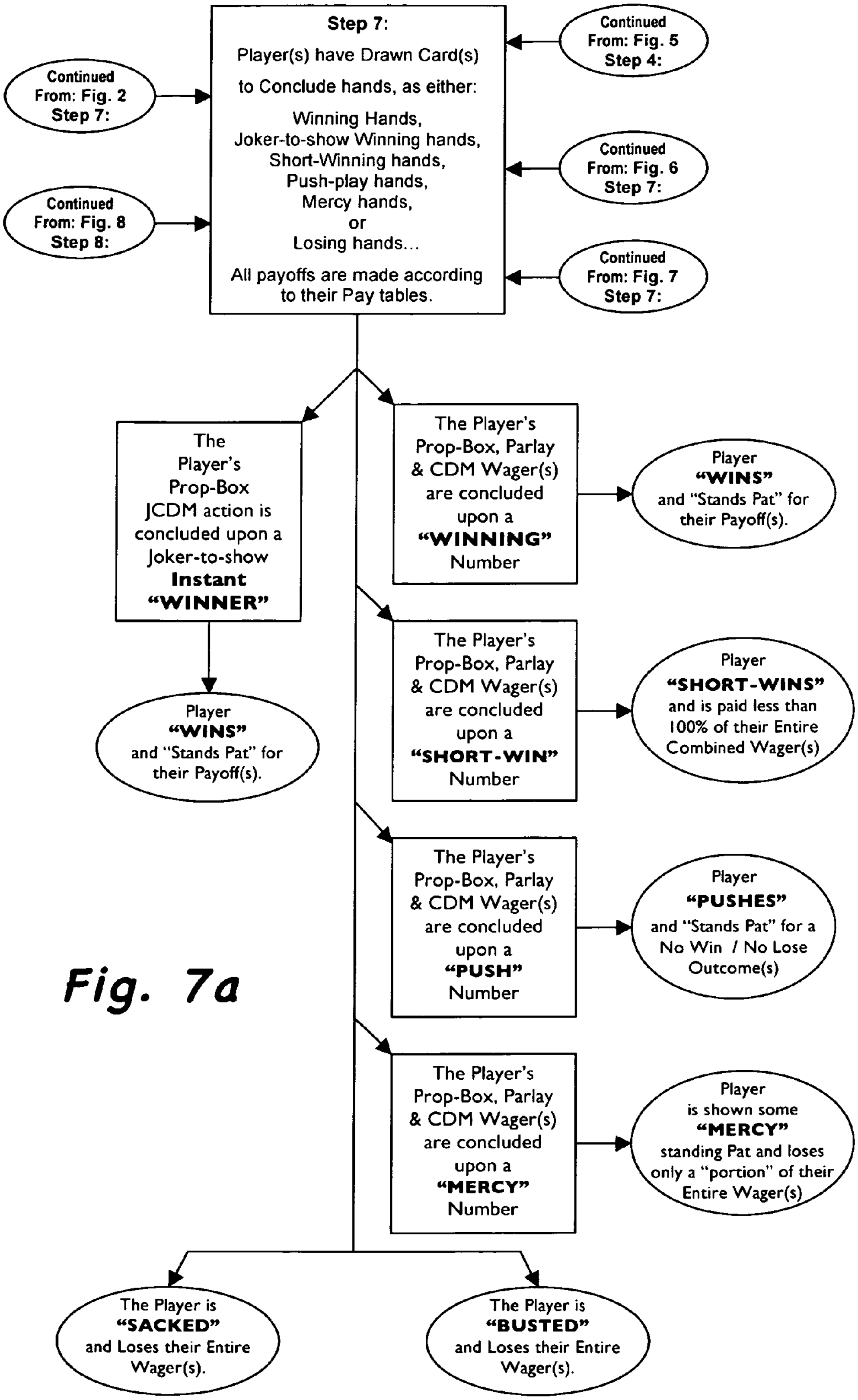
FIG. 7*a* Illustrates the broad consequences for play action \Athin the Propositions Box.

However, now Players also have a key "bypassing" option to move any unrestricted cards outright to the Propositions-Box for an optional chance to increase their contact wager or at least engage a better chance to draw upon an automatic winning hand of a: 20 or 21, or what is now at least a "Mercy" outcome, as discussed throughout FIGS. 7 & 7*a*.

Figure 5:
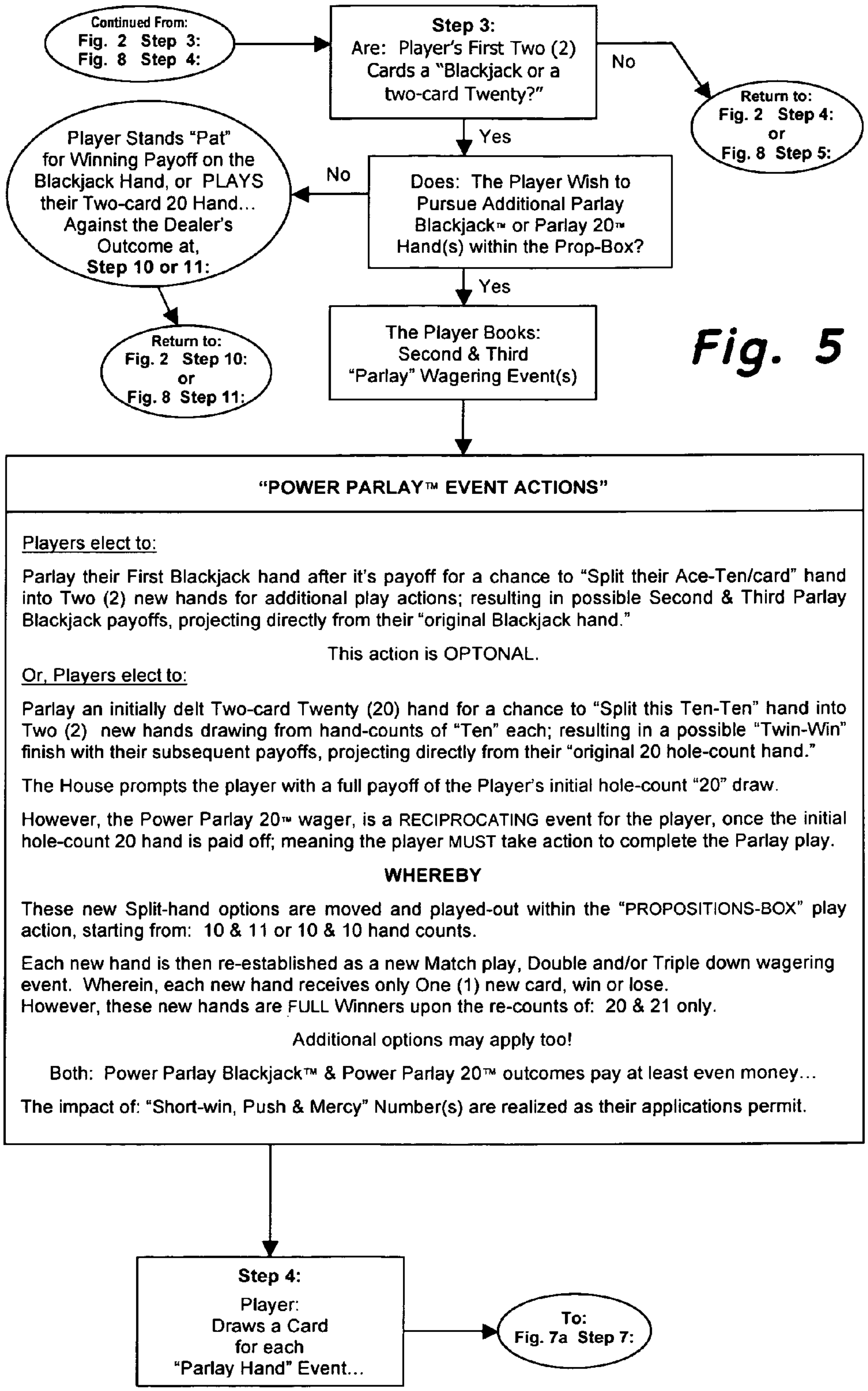
FIG. 5 Illustrates both POWER PARLAY™ hands for play within the Propositions-Box.

Similarly, if the Player feels compelled, it may well be in the Player's interest to take a shot at the Alternative Bypassing Strategy strategy for play into the Propositions-Box, or the alternate Secondary Decisions Multi-Down play action method for some of these very same of hands; including the game's newly integrated, Split Ten-card "POWER PARLAY 20™ play action option" designed for reciprocal play within the Propositions-Box, as again discussed in detail in FIG. 5.

Figure 6:
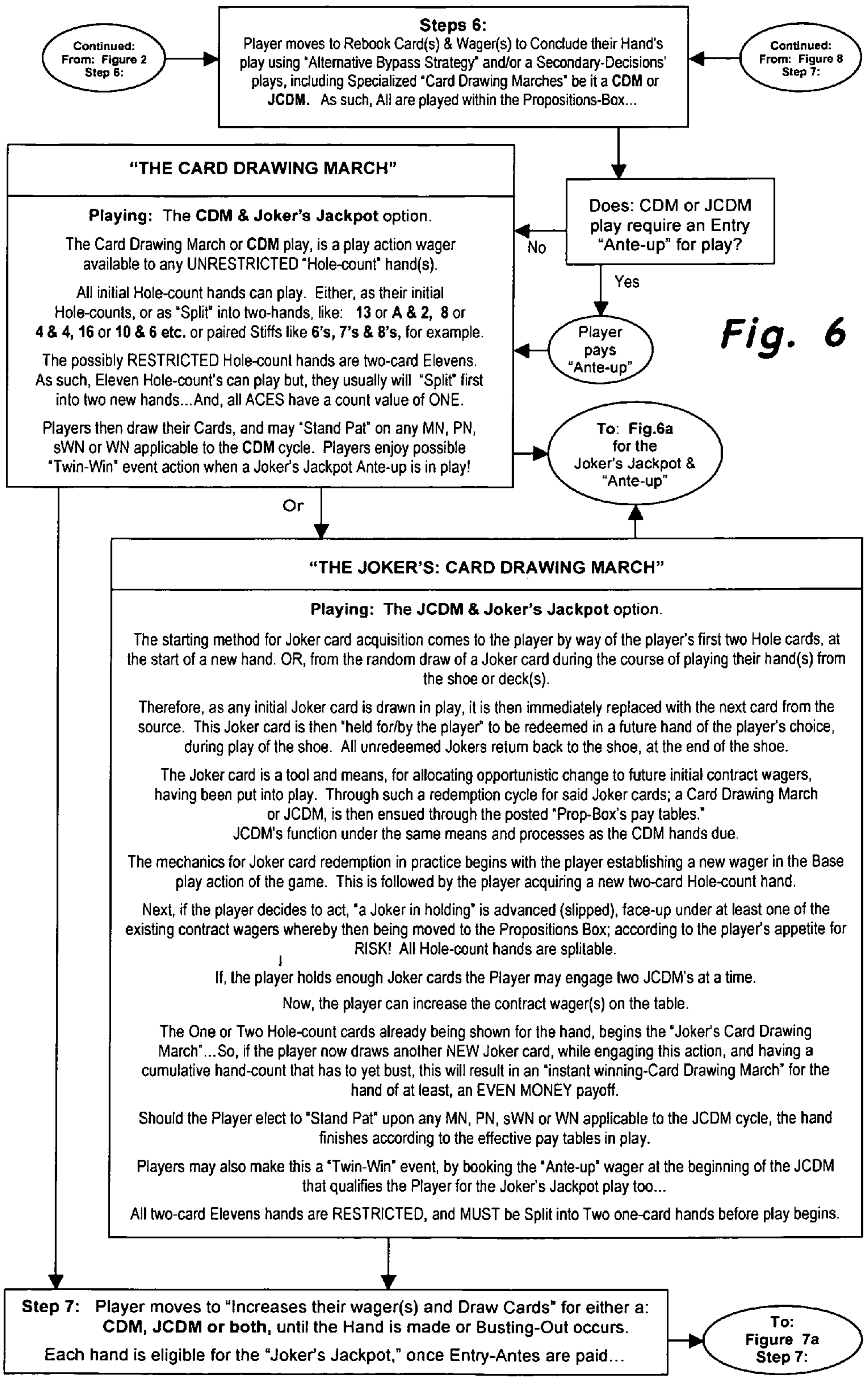
FIG. 6 Illustrates both CARD DRAWING MARCHES™ for play within the Proposition-Box.
Figure 6A:
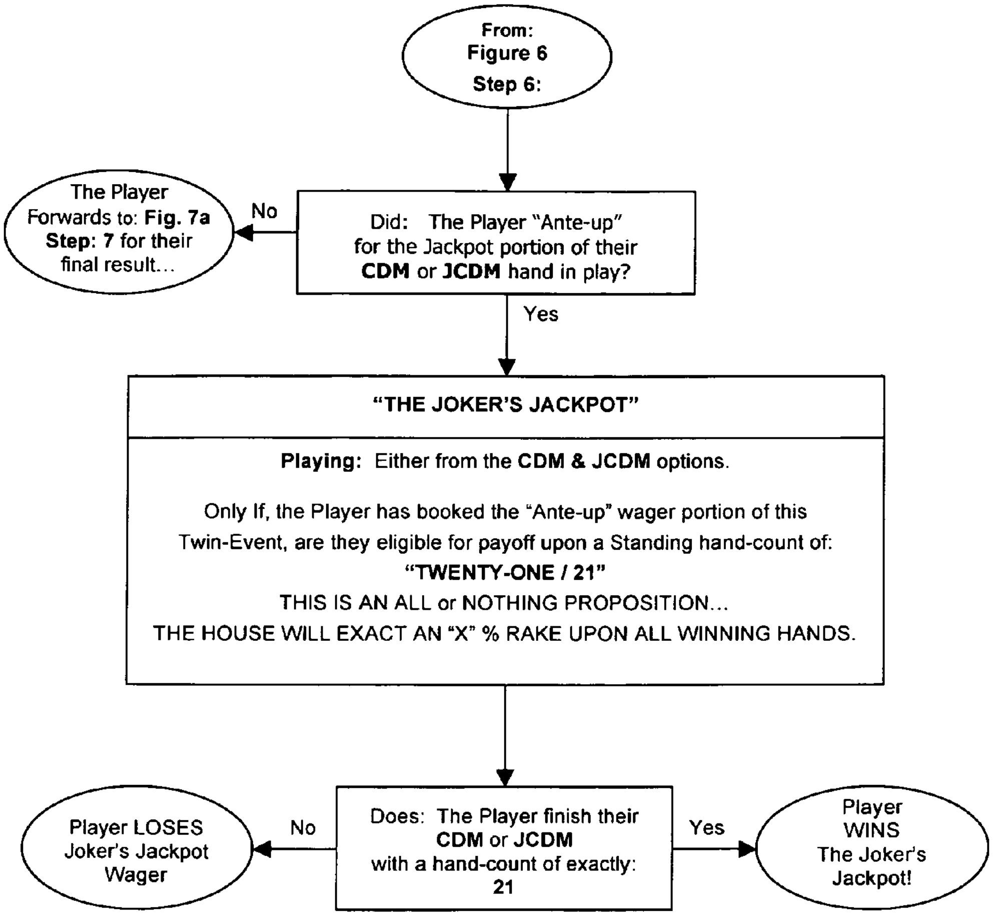
FIG. 6*a* Illustrates the optional Joker's Bonus Jackpot.

Another direct creation and consequence of the Applicants' menu of Secondary Decisions occuring within the Prop-Box is the new dual integration of the CARD MARCHES™. As such, CDM's & JCDM's, also bring to the Secondary Decisions action of the Propositions-Box their own tag-along "Bonus Jackpot," which is further disclosed in full detail within FIGS. 6 & 6*a*, respectively.

Figure 8:
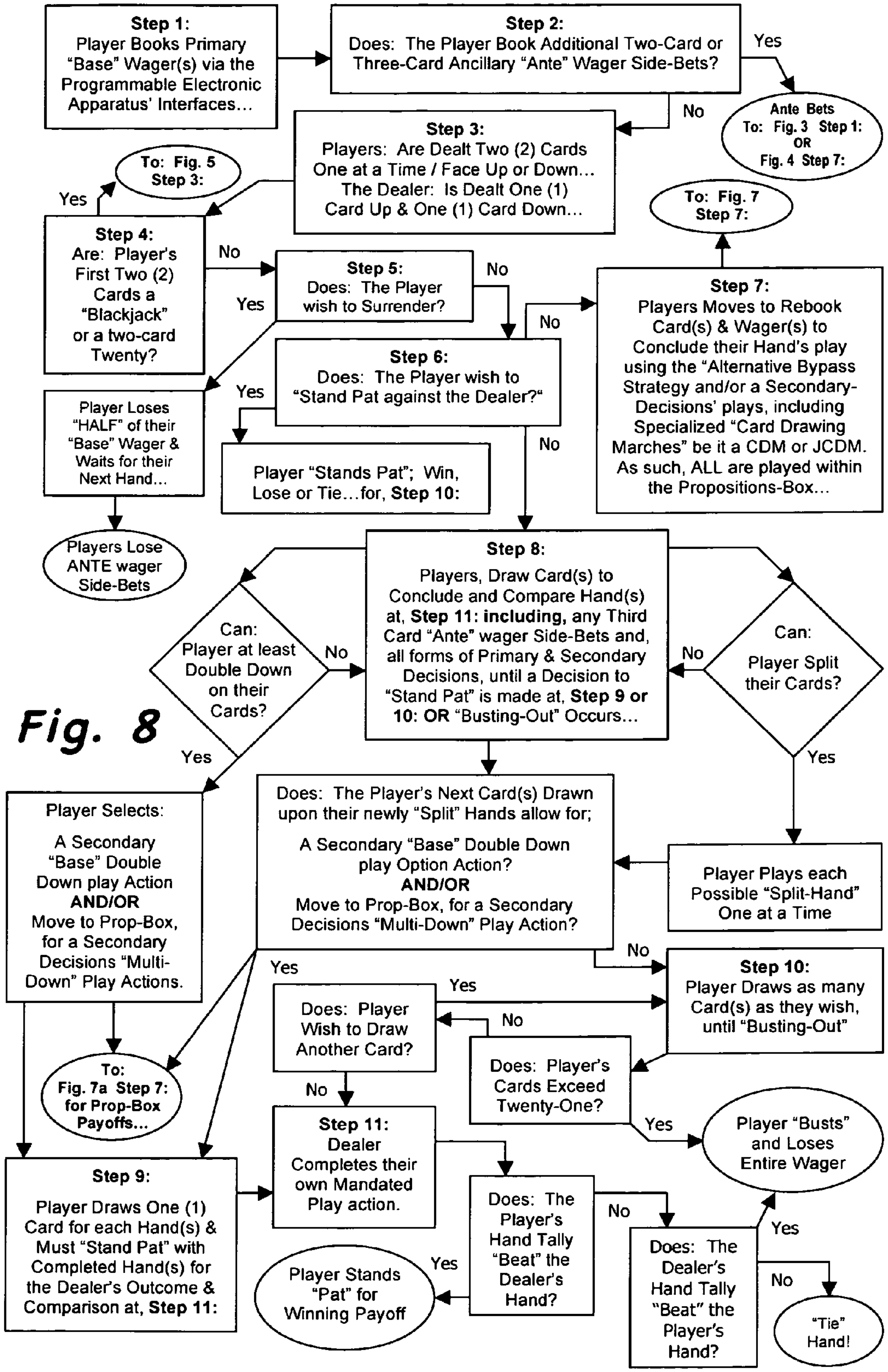
FIG. 8 Illustrates the general flow of progressive event/decisions to complete a round of play for a programmable electronic apparatus and/or wireless devices being applied for the game.

FIGS. 1, 2 & 8 clearly illustrates the flow of progressive events showing the Player's option to draw card(s) as they see fit without Busting, or to avoid, and bypass, the appearance of a strong Dealer's up-card in play as well as the Player's incumbent need to "Stand Pat" if the Player decides to draw for the One (1) card allowed for either an initial Secondary Base Double-Down play and/or the alternate Secondary Decisions Multi-Down Propositions play action being offered.

Figure 4:
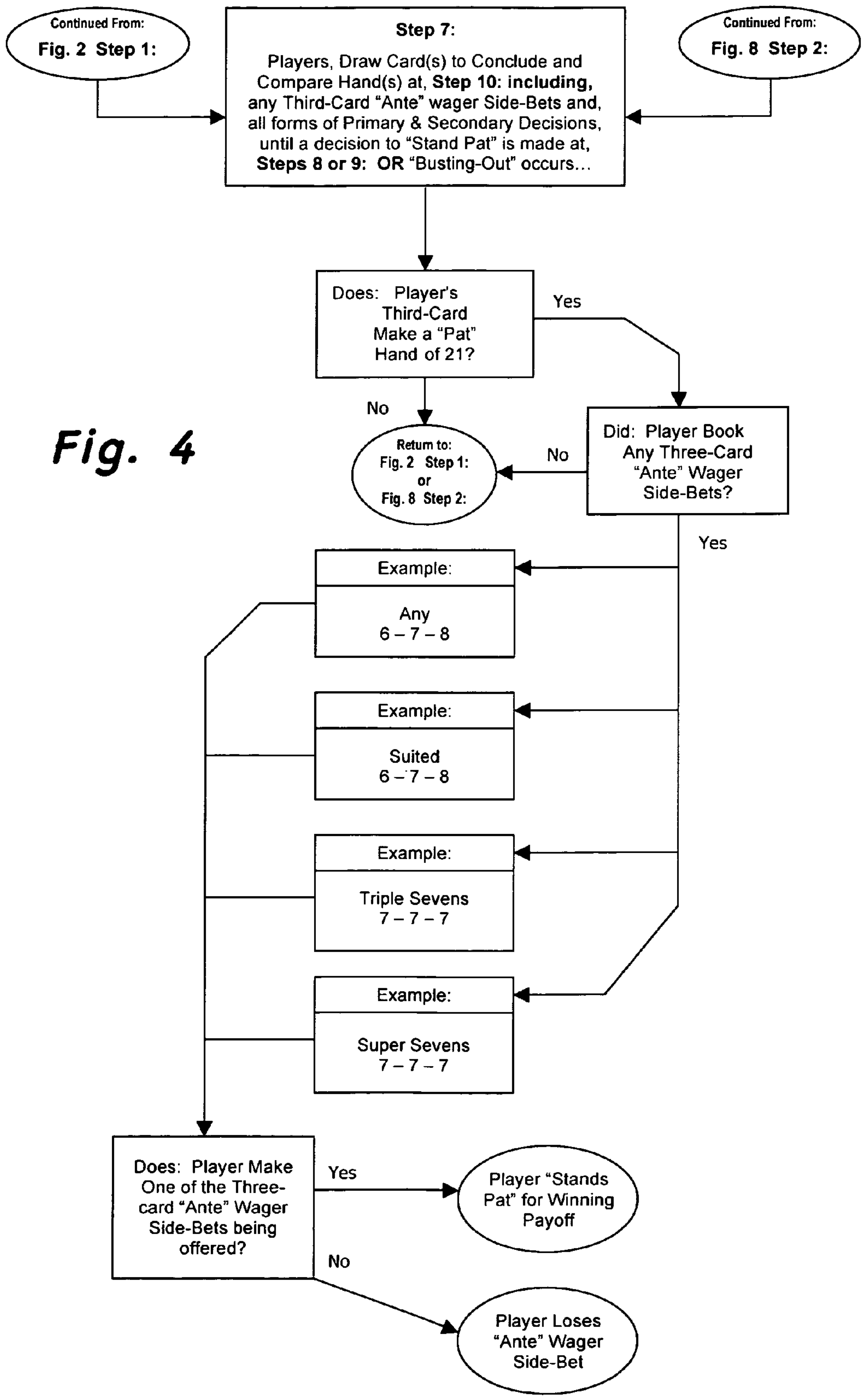
FIG. 4 Illustrates some options for a first, three (3) card ancillary "Ante" type side-bets.

Furthermore, winning hand tallies show upon the deliberative draw of third-card play actions too, and can be inclusive of three-card ancillary Ante wager Side-bets, assuming they were initially offered and booked, as illustrated in Step 7: of FIG. 4.

Likewise, if in the process of playing out a Secondary Decision-Propositions wager, a Player Stands Pat upon a hand count of an optional short-Win, Push-play or Mercy-shot Number(s), as being applied, such a circumstance resolves the Player's hand count as either a short-Win; meaning their winning wager is paid less than a 100% payoff on the hand's cumulative total wager, or a Push-play meaning a no win no lose outcome, or as a Mercy-shot; meaning the player loses only a portion of their total wager for the hand, as all discussed within FIGS. 2, 7, 7*a* & 8, in toto.

As clearly affirmed, if a Player Stands Pat with a hand count "short" of the Dealer's hand count for any kind of play action(s) being played against the Dealer's hand count, or as applied upon any number of Proposition-Box play actions; including all forms of bypassing card plays, Split-hand plays, Mufti-Down, Parlay and CDM plays where the Player's final hand tally finishes "short" of a "Winning" 20 and/or 21 hand count, or consequently the first and/or lowest short-Win, Push or Mercy Number(s), being numerically applied, the Player's hand(s) are then "Sacked" and they lose their entire contract or accumulated wager(s), as well as any ancillary Ante wager Side-bets for the hand they may still have booked. FIGS. 2, 7, 7*a* & 8, all guide and illustrate the consequences of not acquiring a winning hand.

Finally, FIG. 9 in toto, provides an Exemplary Counsel Embodiment that unequivocally guides the Applicants' intentions for general play action along with a complete play action digest of their Alternative Bypassing Strategy means; including an illustative mix of their Secondary Decision's menu for laying off Stiff-hands, booking Parlays, CDM's, JCDM's and Jackpots all via the Prop-Box . . . .

Operational Advantages

Suffice-it-to-say that until now, within the practiced bounds of Blackjack, no one has ever proffered to establish a menu of wagers like the Applicants' Secondary Decisions class of high stakes wagers, as applied; via the process of the Propositions-Box, whereby providing simultaneous advantage wins on both outcomes of 20 & 21, within the vast narrative of play action events.

Neither have the Applicants ever personally heard of, or read about the idea of, or even the mere suggestion of, applying such rules supporting such play within the bounds of Blackjack.

Indeed, the Applicants' Alternative Bypassing Strategy breakthrough, again makes possible all that is being newly revealed and promulgated into play, by virtue of the expanding menu of Secondary Decision options, as declared within this disclosure which classic Dealer Hand Blackjack methodologies have clearly never envisioned of prior to the Applicants' revelations.

Additionally, the Applicants new introduction of their complete Twelve (12) to Twenty-one (21) differential thread mix, as applied to: short-Wins, Push-plays and/or Mercy-shots, ameliorating the mathematical affects upon a complete menu of Secondary Decision options being offered, and operating via the Propositions-Box, up until now, was also unknown to the game.

Also affecting the players of the Applicants' methodology is the wholly optional impact of Housemasters aggregating use of differing types of decks, and/or shoe configurations, being offered and applied during the game's play. As observed within the Parent case, these optional deck configurations were then simply identified as "modified decks".

Moreover, as now clearly defined these "modified decks" as applied for play action are envisioned as Carnival deck configurations, having Fifty (50) cards in play which would represent a "significantly fatter" House Vig-margin of a: "Y" value, to the "core mathematics for redistribution" to players. Yet, Spanish configured decks, as applied with Forty-eight (48) cards in play, adds an even more generous Vig-margin to a: "Z" HA value for all of the same redistributive purposes.

As also discussed in great detail within this disclosure, is the optional application and distribution of each deck's Two (2) Joker cards. Manifestly, the use of Joker cards usually is a problematic proposition, given the mathematical skew, or even recklessness for which Joker cards typically conceal in their gaming application. However, the Applicants have sequestered and tamed the Joker's ability to run, and play wild, in such a way as to make them by and large, mathematically impotent or inert, aside from their well defined roll(s).

In play action support of the Applicants' methods, these deck configurations provide an extra wide measure of "core margin mathematics for redistribution" into a panoply of wagers being orcastrated; via the Applicants finely tunable differential thread mix of ameliorating number agents, as applied into new classes of wagers and/or better payoffs for a number of existing ones . . . .

Presently, a Standardized Fifty-two (52) card deck for play supports a final House-Advantage edge within the the combined rules for play as applied, within the "traditional Blackjack aspects" of the Applicants' overall play action model; including the application of the Applicants' Alternative Bypassing Strategy, and menu of Secondary Decision options, being deployed via the Propositions-Box, at all of −0.365% negative Player EV (i.e. expected value), when playing the Applicants game. Although, a better understood means to convey this is to say, the House keep's 0.365% in the game, or makes a little over 3½ cents from every dollar crossing the table. This is actually quite a remarkable feat, given that as stated earlier, most traditional Blackjack games in operation today enjoy a HA of, 0.62% or less . . . sometimes a lot less. Indeed, these traditional games also have nowhere near the alluring innovations nor the margins the Applicants means offer.

Heretofore, if the Housemasters wanted better margin they took Player advantages away, like the 3 to 2 payoff on Blackjacks, with "no reciprocating recourses" for the leveling of advantage. Over time, this has lead, and will continue to lead to even higher player disinterest; risking smaller amounts of money, and leading to that ever growing pool of outright defections from play.

To the contrary the Applicants have designed lots of change, constructive change for their efforts, and it shows . . . . Take just the "bypassing recourse" for example. This bypass means, alone changes a minimum bad exposure to Stiff hands at a present rate of 38.5%, assuming such cards are being dealt from truly random decks or shoes over the long run, wherein 31% to 62%, of said Stiff-hands indeed fall-out as guaranteed losers for the Player. This hurts, and chases people away!

In comparison, the Applicants' methods operating through the Prop-Box are projecting a very new, very different horizon; offering Players of the same randomly dealt Stiffs, a conversion rate for their expected 38.5% catch, at a long-run maximum finish hand experience of a 28.36% guaranteed loss. Consequently, for the Player all actions executed into the Prop-Box offers Players something very close to this: 24.94% of hands will finish as "winners," and 41.87% of all hands will finish their action as "light-losing Mercy-shot" outcomes, where the player keeps 50% of the total contract wager at risk, and that's a better deal for Players and House alike, over the short and long-runs, respectively! The final 4.83% are the "hole-count Blackjacks expected" from a six-deck shoe.

For the magnitude of the "Mercy-shot" as applied by the Applicants' play action methodologies, is truly a Master Amelioration at work . . . The "Mercy-shot," buys the allure of more Time-In-Play for the Player, not so much a change in inevitable result.

On the one hand, the Applicants' methodology set precedence, by turning $10.00 dollar bettors into $20.00 dollar bettors, directly do to the ameliorating allure created particularly by the "Mercy-shot" outcomes as being applied, and experienced by Players, via the Prop-Box's enticing "Stiff hand" alternative. Or, for example on the other hand, this means the "Grind-player" gets to play longer on the same dime, having a better experience that keeps bring'em back with there friends and alot more money in there pockets . . . .

Yet another new and improved player recourse, is the Applicants' Parlay replay Blackjack hand, that now not only expands the play options for the Player's initial winning Blackjack as previously taught, it now introduces the playing public to another new level of play action no one knew was possible . . . And now, repeating PARLAY BLACKJACK™ hand(s) feature a: 3 to 2 Payoff. That's a 3 to 2 payoff, on up to a Triple Down bet, instead of just Even Money! Furthermore, The Applicants are introducing the all new two-card POWER PARLAY 20™ hand, never again will Splitting Ten-cards be socially frowned upon by other players at the table!

As for Housemasters, they will enjoy the 0.60 to 1.33% & 3% advantages respectively, over the Players thereof. Housemasters, will also enjoy the new dual additions of the CARD MARCHES™, along with a self financing progressive Bonus Jackpots, all of which is part & parcel of this aforementioned "fork in the road" for wagering consideration into the Propositions-Box. As such, the HA on CDM's are dependable even after paying off winning CDM's along with the rake of say 5% to 25% off the top, of the frequenting Jackpots as they are won, and then paid, is truly great for the franchise of Blackjack at large, and the House more specifically.

Furthermore, as it is revealed herein, the Applicants' methods also provide certain additional advantages when encompassed within, and deployed via the operation of interactive video gaming devices, as provided for the game, be they "wireless hand-held devices" or otherwise.

In considering the Applicants' modifications as applied to an electronic process for play, a broader scale of Player interactions being carried upon the interactive platform and software of a "Host apparatus" can now allow for the significant variations of regulatory law coming into affect, including "broader mathematical opportunity" and the fact that in mobile wireless or video mode, the Applicants' gaming process is also engaged into a "real time computing environment.".

In this environment, the issuance of monetary units (i.e. credits) and their valuations are not as constricting upon the play-by-play action of the Applicants' processes for play.

This means there are no human factors slowing the game to figure out what can now be a more sensitive fractional, even mill-age, addition or deduction to a Player's wager or payoff, when a decision to Stand Pat is made. Moreover, no human mistakes in calculation are possible either! Therefore, a perfectly worthwhile process for introducing the Applicants' modifications into the public's eye will be provided through either "singularly intimate" or "community style" play applications, or the like.

However, if played within a third party's electronic device or even a partial electronic device, displaying physical playing cards along with electronic wagering being made upon a virtual table's surfaces supporting such electronic interactions among its players, it is then axiomatic, that Housemasters would also require the use of state agency approved, electronic equipment. Such computing equipment, is universally supported by numerous LAN/WAN networks, as being applied.

Insofar as to include, player input/output interfaces, video screens, combination sources of processing power, huge memory applications, including flash memory and the like, battery's of RAM, EEPROM, storage software, RNG's and a litany of protocal functions for deploying the Applicants' software in operations, not to mention an amass of security functions operating in real time too.

These very capabilities & protocols are prevalent in their present day third party availabilities. Today, the Applicants' gaming methods can be carried out upon a complete virtual reality platform for multi-player action too, such as disclosed in (U.S. Pat. No. 6,607,443 to Miyamoto et. al.), for one example. The content of this very Patent, and the many others providing such methods and means, is hereby observed and incorporated by reference.

Another "value added" aspect of the video application process is that ability to string any number of video units and/or wireless hand held devices together for community play across any number of geographical localities throughout the world supporting any number of traditional Base and/or Proposition type wagers, or batteries of ancillary Ante wager type Side-bets and/or progressive "Jackpot" opportunities. And, if that's not enough, how about all tournament play possibilities! As for the gaming industry, casinos can once again offer their patrons an exciting addition to traditional Blackjack that is simple to grasp and, at times, can prove to be even more generous to their patron's Time-In-Play.

And finally, the Applicants' process of play either in its table gaming format or its interactive electronic formats provide solutions that not only support richer incentives for a patron's play action, but indeed, the Applicants' methodology will very likely simultaneously propagate a significantly "fatter" Win-percentage value for Housemasters as well. This will be accomplished by drawing out much larger sums of capital across its play action environment(s) with greater ease in shorter spans of time.

From the Player's continuum perspective, the Applicants believe that given the totality of their featured Alternative Bypassing Strategy, and it's menu of Secondary Decision options, as played out via the game's Propositions-Box, having been so thoroughly disclosed and discussed herein, there exists, just the right incentives necessary for reinvigorating the blackjack franchise, and maybe, proving to be a most timely vision too . . . .

Accordingly, the present invention has been described with respect to specific methods, modifications & models along with an effective counsel embodiment being shown. Likewise, it will be understood that various changes and further modifications will be suggested by those skilled in the art. Therefore, it is the intent of the Applicants' to anticipate such changes and modifications as falling within the scope of the appended claims.

We claim:

1. A method to proliferate a gaming process and strategy for playing a modified game of blackjack, utilizing any acceptably configured or modified decks of cards in application to a wholly new alternative bypassing procedure and play action strategy, whereby directly benefiting housemasters and players thereof, comprising:

a gaming process and strategy for playing a modified game of blackjack, utilizing any acceptably configured or modified decks of cards in play;

said gaming process having each player establish an initial base contract wager to play the game;

with, the modified gaming process having a player's hand, and a dealer's adversarial hand, being dealt;

said player, then receives an initial two-cards up or down, to establish an initial first two-card hand-count of up to twenty-one for play action;

along with a dealer receiving an initial two-cards, one being the up-card, and another being a down facing hole-card, that establishes the dealer's initial adversarial hand-count for said play action;

awarding all initial two-card winning hand-count tallies according to the prevailing rules for payoffs;

prompting said player, to then assess said initial two-cards simultaneously along with the dealer's up-card to evaluate and pursue a quick analysis for general advantage, aimed at either continuing play against the dealer's hand within the primary or secondary base play action of the game, or to bypass, and move away from said continuing play against said dealer's hand, by utilizing a more optimal alternative bypassing procedure and strategy action, via a propositions' process, while avoiding further play action against a strong dealer's up-card and likely winning hand, during a round of play;

and, by further prompting said player to engage the usefully ameliorating means of said optimal alternative bypassing procedure and strategy for executing play actions via the propositions-box and its pay table processes, wherein said player may acquire, expedient access into the means of a secondary decisions' fork and menu, for providing proprietarily designed wagering options, as being selected for said play action therefrom;

also, said propositions' processes further engages the utilization of a uniquely coalescing differential number thread mix and agency of mercy number's, push number's, short winning number's, winning number's, as well as losing numbers as all being utilized from 12 to 21, while having any said secondary decisions' fork wager as selected by said player for play action via its affiliated pay tables, are to be opted into, prior to said player drawing any additional cards, whereby playing out said player's hand into the expanse of said optimal alternative bypassing procedure and strategy;

having all such play actions as associated with said alternative bypass strategy means for play, via its procedural processes within said propositions-box, along with its wagering methods for executing said play actions, that will only occur, before the dealer reveals said down facing hole-card to players at large, which then only further occurs during the traditional completion of said dealer's hand, for said round of play;

also, said player may inherently opt into assessing their own said initial two-cards, simultaneously along with said dealer's up-card, for a decision to stand-pat, or to draw additional cards, in pursuit of said traditional primary or secondary base variety of play options, as to complete said player's hand-count outcome, being played out against said dealer's final standing adversarial hand-count outcome, whereby awaiting a win, tie or loss, for said round of play.

2. A modified game of blackjack, enabling a wholly new proprietary procedure, while being played via a programmable electronic gaming apparatus, involving the prevalent electronic simulation and distribution methods of the day, for displaying either standard or modified decks of cards for play of said game, whereby directly benefiting housemasters, and players thereof, further comprising:

a modified game of blackjack being secured for play, via the utilization of a programmable electronic gaming apparatus, capable of applying any prevalent softwares of the day, for which the fully utilized functions of the host electronic apparatus are projecting all of the required simulations and displays for play, as well as the necessary distribution methods and security applications for play, which are all being brought to bear for the play action benefit of said modified game of blackjack thereof;

prompting said players of said modified game of blackjack, to book and display an initial base wager starting each new round of play upon said programmable electronic gaming apparatus, along with the utilization and display of at least one standardized or modified decks of cards, for further displaying a player's initial two-card hand of up to twenty-one, while also displaying, a dealer's initial two-card hand, exhibiting one card being dealt up, with another card being dealt down, having a hand-count of up to twenty-one, that establishes said dealer's adversarial hand in play;

means for playing said modified game of blackjack, via said programmable electronic gaming apparatus, having said players thereof, simultaneously assess their own said initial two-cards, along with the dealer's up-card to evaluate and pursue a quick analysis for general advantage, aimed at either continuing the initial primary or secondary base play action already underway against the dealer's hand, or to bypass, and move away from continuing such play against said dealer's hand, to engage the means of a secondary decisions' fork and menu of proprietarily designed wagering options for offering said player thereof, a panoply of new wagers being accessable for play, via the means of a propositions-box and its pay table processes, for altering said player's play action during the round;

means for providing said players of said modified game of blackjack, the ameliorating decision making means of an alternative bypassing procedure and strategy for players use thereof, when accessing said propositions-box for its pay table processes during play, as such actions, are opted into prior to said players' drawing of any additional cards, for the round of play;

means for providing said players of said modified game of blackjack, having player hands being dealt through to completion, via the means of said propositions-box and its processes for play, that both begins and ends its play actions therefrom for said players' hands, before the dealer reveals their down facing hole-card to players at large, which further occurs during the traditional completion of said dealer's hand, then finishing said round of play;

means for providing said players of said modified game of blackjack, with the additional means of said secondary decisions' fork and menu, for providing proprietarily designed wagering options during play, which further includes and deploys an optional parlay, split and, or increase, wagering replay process for playing a parlay twenty replay event, via said propositions-box and its pay table processes guiding play thereof, that occurs immediately after any hole-count twenty hand is paid-off, whereby providing a replay for said hole-count twenty hand, via the reuse of the two, ten valued cards making for two new ten-count hands for replay, that are reciprocally accessible for just such replay events, within said propositions-box of processes, finishing said round of play;

means for playing said modified game of blackjack, via said programmable electronic gaming apparatus as applied in use thereof, while a decision for continuing pursuit of said traditional primary or secondary base variety of play options is affirmed, via said quick analysis for general advantage, aimed at either continuing to stand-pat, or to draw additional cards, as then said player's hand is finalized through the traditional play and hand comparison process being made against said dealer's standing adversarial hand-count outcome, for said round of play;

means for playing said modified game of blackjack, via said programmable electronic gaming apparatus as applied in use, engaging virtual card dealing thereof, settling all sacked hand counts, short of said dealer's standing hand-count being applied, as a complete loss for the player, while settling all player busting hand-counts drawn over twenty-one, as wins for the house.

3. The apparatus of claim 2, further comprising said additional ameliorating means of said alternative bypassing procedure and strategy for players use thereof, that inclusively supports the applied means of said propositions-box of pay table processes being operationally deployed, utilizing a number of randomly applied and coalescing number agents operating from 12 to 21, for inducing said players thereof, to first consider laying-off their hole-count stiff-hands into said propositions means for play, or to embrace said secondary decisions' fork class of wagers for play, whereby said players are benefitting from an alternative strategy solution that ameliorates said players exposure to risk, particularly during the many rounds of stiff-handed play, said players are continuingly going to receive.

4. The apparatus of claim 3, further comprising said means of said propositions-box and its processes for play, that randomly applys a coalescing thread of number agents, being selectively deployed as losing numbers, mercy-shot numbers, push numbers, short-winning numbers, and winning numbers which randomly populates the complete means of the 12 to 21 differential thread mix of number agents, for luring said players into said bypassing strategy means for either laying-off initial stiff-handed hole-count plays of 12, 13, 14, 15 and 16, or for luring said players into the means of said secondary decisions' fork class of wagers for play, that operate via said means of said propositions-box and its pay table processes for play, during said round.

5. The apparatus of claim 3, further comprising a means for settling all sacked hand counts, that fall short of the lowest applied number agent of said 12 to 21 differential thread mix and means for play of which said players hand, is numerically standing-pat upon within said propositions-box and its pay table processes for play, that count as losing hands, for said round of play.

6. The apparatus of claim 2, further comprising the means of said secondary decisions' fork and menu, for providing newly designed proprietary wagering options during play, which further includes and deploys the means of an optional split and, or increase, wagering replay process for playing a specialized card drawing march event, via said propositions-box and its pay table processes guiding said players thereof, as such actions, are opted into prior to said players drawing of any additional cards for the round of play, and further occurs prior to the revealing of said dealer's down facing hole-card to players at large, finishing said round of play.

7. The apparatus of claim 2, further comprising the means of said secondary decisions' fork and menu, for providing newly designed proprietary wagering options during play, which further includes and deploys the means of an optional split and, or increase, wagering replay process for playing a specialized joker card drawing march event, via said propositions-box and its pay table processes guiding said players thereof, as such actions, are opted into prior to said players drawing of any additional cards for the round of play, and further occurs prior to the revealing of said dealer's down facing hole-card to players at large, finishing said round of play.

8. The apparatus of claim 2, further comprising said newly selected specialized card drawing march events, or said newly selected specialized joker card drawing march events, as operating via said propositions-box and its pay table processes, guiding play action thereof, which further includes and deploys the means of a bonus jackpot option acting as an additional wagering process being directly affiliated along with the simultaneous play action of either type of said card drawing marches being operated by way of, an optional split and, or increase, replay means of playing said specialized card marching events, aimed at enticing said players thereof, to access said bonus jackpot option, as a consequence of entering either type of said card marching means for play, that are opted into prior to said player's drawing of any additional cards for these events at play, which also further occurs prior to the revealing of said dealer's down facing hole-card to players at large, finishing said round of play.

9. A method for a dealer, and players, to play a modified game of blackjack, establishing the use of a number of acceptably configured decks of cards, resulting in the provision of a wholly new alternative procedural methodology and strategy for play, directly benefiting housemasters and players thereof, comprising the steps of:

(a) establishing the use of a number of acceptably configured decks of cards, utilizing either more or less than fifty-two cards within said decks, for play of a modified game of blackjack;

(b) prompting said players to make an initial primary base contact wager for play of said modified game of blackjack;

(c) prompting said players to make additional ancillary ante wager side-bets for play action;

(d) having a dealer of said modified game of blackjack, distributing to all players an initial two-card hole-count hand, facing up or down, of up to twenty-one for each new round of play;

(e) having said dealer of said modified game of blackjack, distributing the dealer's initial two-card hole-count hand, drawing one card facing up, and one card facing down, of up to twenty-one for said each new round of play, (f) opening said modified game of blackjack, via traditional blackjack procedures and options, once said new round of play begins;

(g) settling all first two-card ancillary side-bets, and first two-card winning blackjack hand-counts according to predetermined house rules;

(h) prompting said players to then assess their own initial two-cards; simultaneously along with said dealer's up-card to evaluate and pursue a quick analysis for general advantage, aimed at either continuing play against the dealer's hand, or to bypass, and move away from said continuing play against the dealer's hand;

(i) inducing said players of said modified game of blackjack, with the means of an alternative bypassing procedure and strategy for playing out said players' hands into the means of a proposition-box of pay tables and its processes for play, being opted into prior to said players' drawing of any additional cards;

(j) having said induced players of said modified game of blackjack, playing into said alternative bypassing procedure and strategy means for play, operating via said propositions-box of pay tables and its processes for play, while simultaneously accessing the means of a secondary decisions' fork and menu of proprietarily designed wagering options for implementing said play action therefrom, that all begins and ends, before said dealer reveals their down facing hole-card, in completion of said dealer's hand in play;

(k) pursuing said players of said modified game of blackjack, into said alternative bypassing means for allowing said players thereof, to select at least one of many secondary decisions' fork wagers as being made available, during such play action therefrom, while drawing out at least one additional card to a point of standing-pat upon the means of a coalescing differential number agent operating from 12 to 21 in direct support of, said propositions-box of pay tables and its processes, during said round;

(l) allowing said players of said modified game of blackjack, accessing said secondary decisions' fork means and menu, for providing proprietarily designed wagering options during play, which further includes and deploys an optional parlay, split and, or increase, wagering replay process for playing a parlay twenty replay event, via said propositions-box and its pay table processes guiding play thereof, that occurs immediately after any hole-count twenty hand is paid-off, whereby providing a replay for said hole-count twenty hand, via the reuse of the two, ten valued cards making for two new ten-count hands for replay, that are reciprocally accessible for just such replay events, within said propositions-box of processes, finishing said round of play;

(m) settling all winning secondary decision options for ancillary three-card ante wager side-bets, according to their predetermined pay tables, and rules for payoff;

(n) settling all said player hand-counts drawn over twenty-one, via said propositions-box's means for play, as a complete loss of said players wagers during such play action for said round;

(o) allowing said players of said modified game of blackjack, without an initial first two-card winning hand-count, nor having taken up access to said alternative bypassing means for said modified game of blackjack thereof, to further exercise the option to draw at least one additional card for initiating a variety of traditional primary or secondary base contract play actions for furthering the acquisition of a standing hand-count, of not more than twenty-one being held by said players, that beats said dealer's final standing hand-count, during a round of adversarial play between said dealer's standing hand-count, and said players standing hand-counts for comparison, therein;

(p) settling all standing hand-counts and wagers of said players, having been made upon said variety of traditional primary or secondary, base contract play actions, with said hand-counts and wagers standing upon two or more cards, to be concluded against the outcome of said dealer's hand and outcome, as either winner's, losers or ties.

10. The method of claim 9, providing said players of said modified game of blackjack, having an initial primary base contact wager for play, of step (i) to further allow for players thereof, to further increase the initial amount of said primary base wagers having already been initially booked starting the round, to an amount at least double the original said primary base wagers, including for stiff-hands, starting said round for play action.

11. The method of claim 9, providing said players of said modified game of blackjack, having access to said alternative bypassing means for said players thereof, step (j) to further include, the additional option to increase the amount of any initial primary base wagers, having already been booked when moving into any of said secondary decisions' fork means for wagering, via said propositions-box means for play action.

* * * * *